US012669776B1

(12) United States Patent
Fard et al.

(10) Patent No.: US 12,669,776 B1
(45) Date of Patent: Jun. 30, 2026

(54) BALANCING AND IMPROVING HOLOGRAPHIC WAVEGUIDE EFFICIENCY

(71) Applicant: Amazon Technologies, Inc., Seattle, WA (US)

(72) Inventors: Erfan Fard, Tucson, AZ (US); Pierre-Alexandre Blanche, Tucson, AZ (US); Benjamin David Chrysler, Tucson, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 18/608,088

(22) Filed: Mar. 18, 2024

(51) Int. Cl.
*G03H 1/02* (2006.01)
*G02B 27/01* (2006.01)

(52) U.S. Cl.
CPC ....... *G03H 1/0248* (2013.01); *G02B 27/0172* (2013.01); *G02B 2027/0174* (2013.01); *G02B 2027/0178* (2013.01); *G03H 2223/16* (2013.01); *G03H 2223/23* (2013.01)

(58) Field of Classification Search
CPC ............. G03H 1/0248; G03H 2223/16; G03H 2223/23; G02B 27/0172; G02B 2027/0174; G02B 2027/0178
USPC .......................................................... 359/15
See application file for complete search history.

(56) References Cited

U.S. PATENT DOCUMENTS

| | | | | |
|---|---|---|---|---|
| 8,233,204 | B1 * | 7/2012 | Robbins ................. | G02B 27/01 |
| | | | | 359/566 |
| 9,513,480 | B2 * | 12/2016 | Saarikko .............. | G02B 6/0033 |
| 2006/0228073 | A1 * | 10/2006 | Mukawa .................. | G02B 5/18 |
| | | | | 385/31 |
| 2013/0051730 | A1 * | 2/2013 | Travers .............. | G02B 27/4272 |
| | | | | 385/37 |
| 2018/0284460 | A1 * | 10/2018 | Cheng ................ | G02B 27/1046 |
| 2019/0056593 | A1 | 2/2019 | Bablumyan | |
| 2020/0225498 | A1 | 7/2020 | Potnis et al. | |

* cited by examiner

*Primary Examiner* — Sharrief I Broome
(74) *Attorney, Agent, or Firm* — Kilpatrick Townsend & Stockton LLP

(57) ABSTRACT

Techniques for improving holographic waveguide efficiency are described. In an example, a waveguide includes a substrate having a first surface and a second surface. The waveguide includes a holographic layer configured to inject, into the substrate as first light, light received at the first surface, diffract a first portion of the first light such that the first portion propagates in a first propagation direction, and diffract a second portion of the first light such that the second portion propagates in a second propagation direction. The waveguide includes a reflective component configured to reflect a remaining portion of the first light as second light from the second surface toward the first surface. The holographic layer is further configured to diffract a first portion of the second light such that the first portion of the second light propagates within the substrate in the first propagation direction.

20 Claims, 22 Drawing Sheets

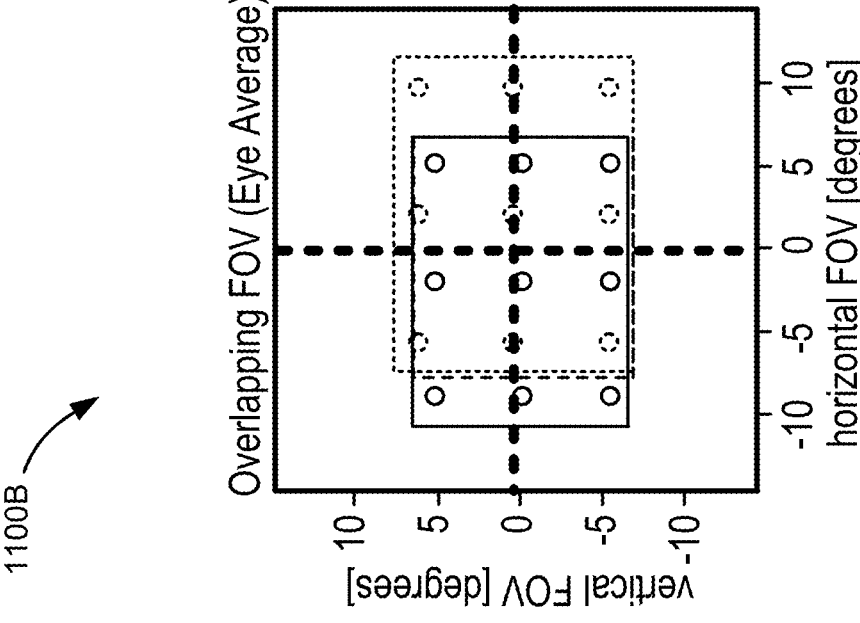
1100B
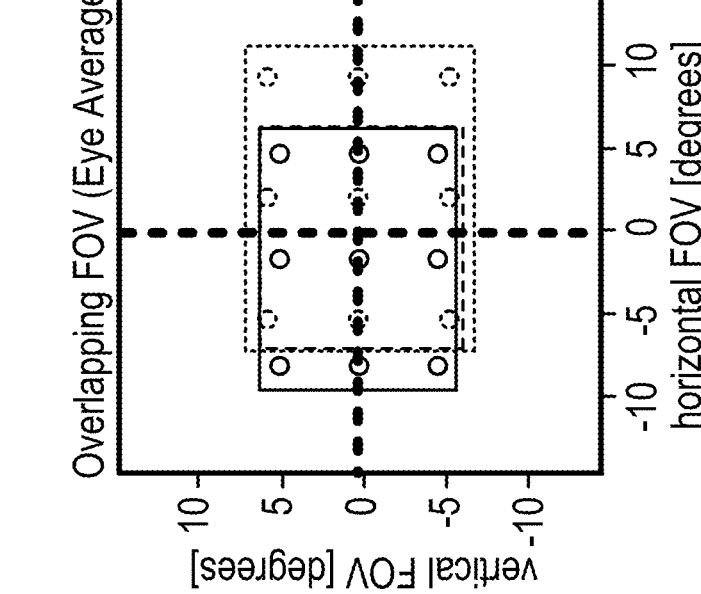
1100A
FIG. 11

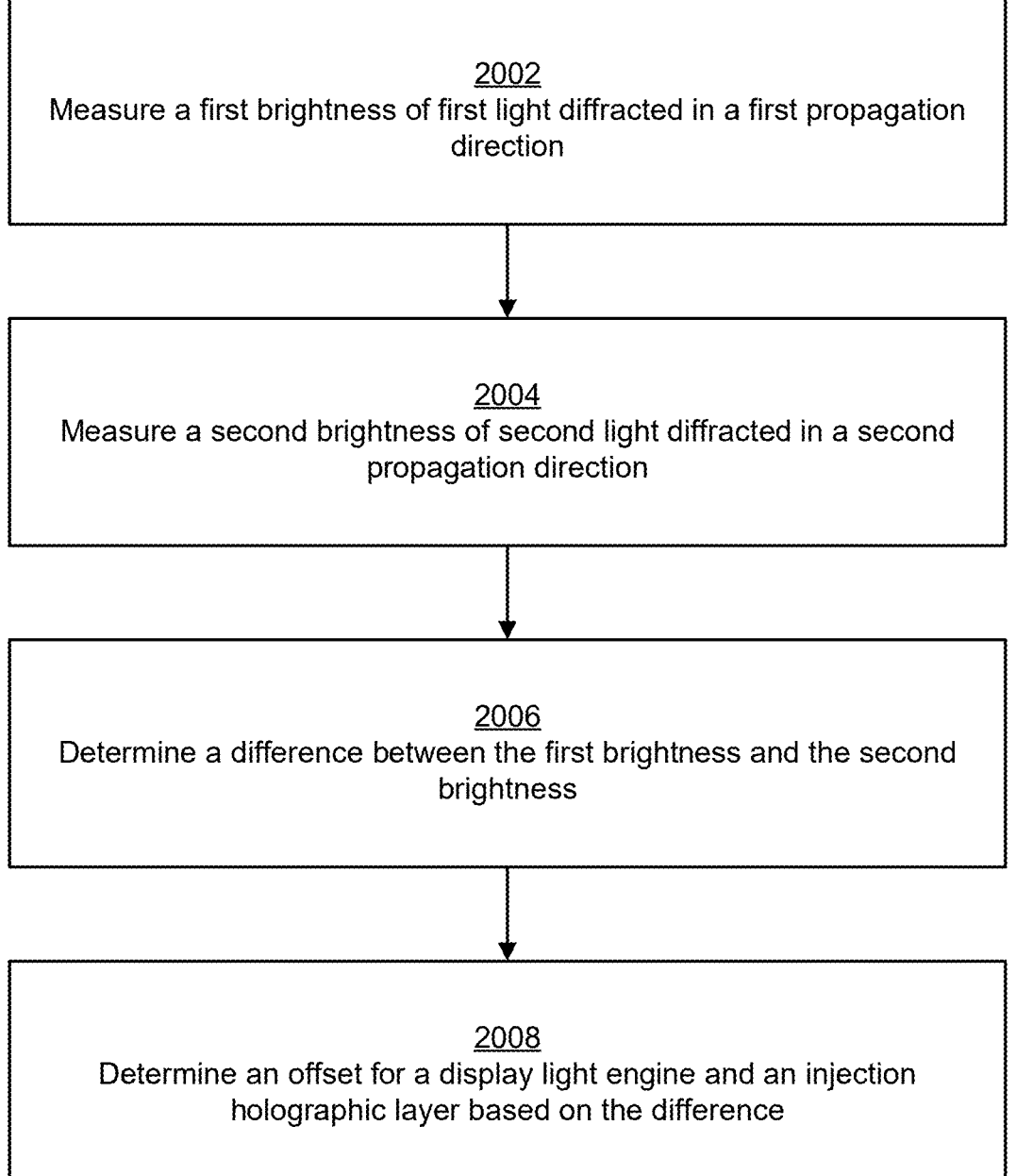

<u>2002</u>
Measure a first brightness of first light diffracted in a first propagation direction <u>2004</u>
Measure a second brightness of second light diffracted in a second propagation direction <u>2006</u>
Determine a difference between the first brightness and the second brightness <u>2008</u>
Determine an offset for a display light engine and an injection holographic layer based on the difference

FIG. 20

Optical
System <u>2200</u>

```
        ┌2210              ┌2230                  ┌2234
┌─────────────┐    ┌─────────────┐      ┌──────────────────┐
│   Projector  │    │  Processor   │      │  Communications  │
│              │    │              │      │      Device       │
└─────────────┘    └─────────────┘      └──────────────────┘
                          2220                      2232
              ┌─────────────────┐      ┌─────────────────┐
              │ Projection Optics │      │     Memory      │
              └─────────────────┘      └─────────────────┘
```

BALANCING AND IMPROVING HOLOGRAPHIC WAVEGUIDE EFFICIENCY

BACKGROUND

Image displays have been utilized in different mixed reality systems such as augmented reality systems that include near eye displays and heads-up displays. In a mixed reality system, an image can be displayed to a user from a light projector onto a light transparent display that allows the user to also view the real world.

BRIEF DESCRIPTION OF THE DRAWINGS

Various embodiments in accordance with the present disclosure will be described with reference to the drawings, in which:

FIG. 11 illustrates example of average fields of view for a right eye and left eye without and with using a reflective component in accordance with an embodiment of the present disclosure;

FIG. 20 illustrates an example of a flow for an active alignment procedure for a bi-ocular waveguide, in accordance with an embodiment of the disclosure;

DETAILED DESCRIPTION

Figure 1:
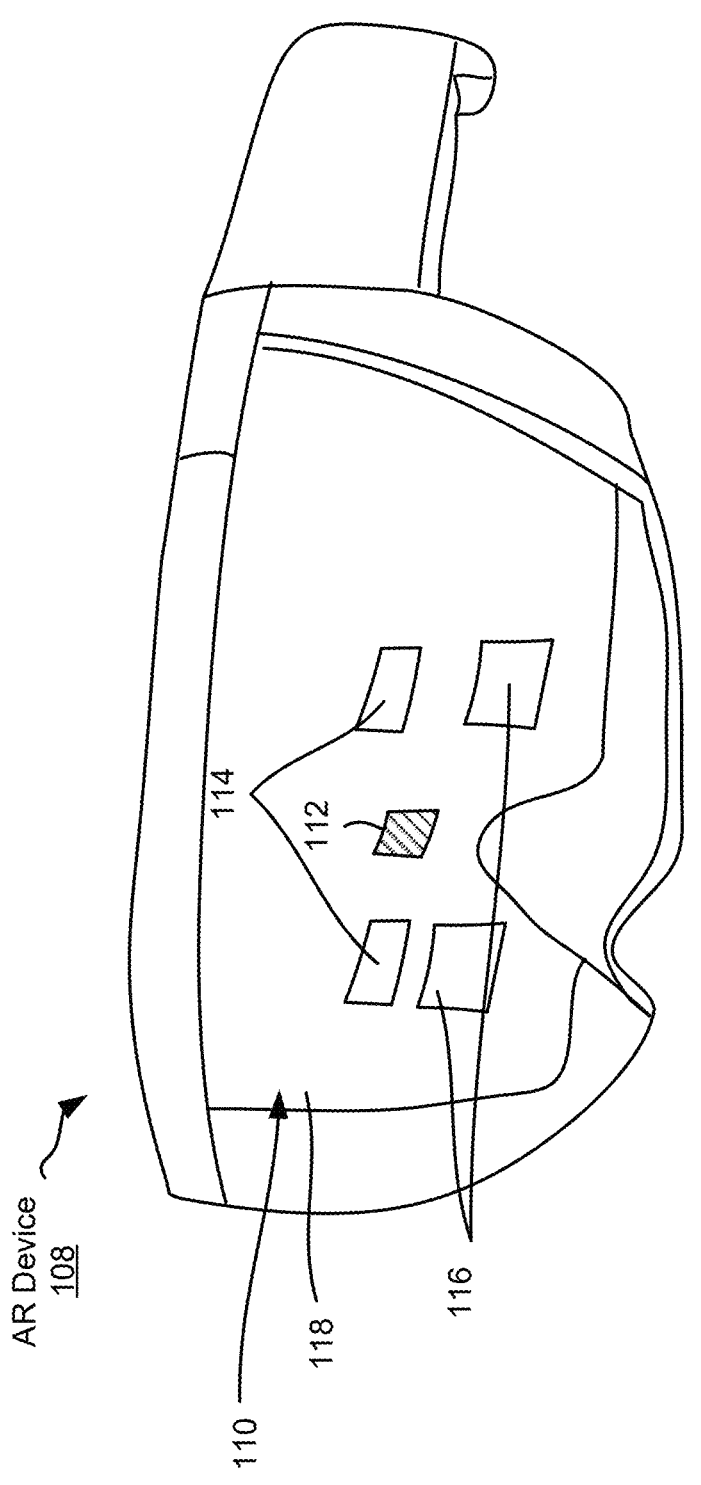
FIG. 1 illustrates an example of a mixed reality device that implements an optical waveguide of a bi-ocular system in accordance with an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, balancing and improving waveguide efficiency. In an example, a light source and a waveguide can be components of a mixed reality device, such as augmented reality device. In an example, the waveguide can include a substrate and an injection holographic layer that is coupled to the optical waveguide substrate. The injection holographic layer may include a stack of volume holographic optical elements, surface relief gratings, or a multiplexed hologram. Light emitted by the light source is received along an axis (e.g., a z-axis) and injected into the optical waveguide substrate. The injection holographic layer diffracts a first portion of the light toward a first redirection holographic layer or a first extraction holographic layer, such that the first portion propagates in a first propagation direction. A remaining portion of the light is not diffracted in the first direction. Instead, the injection holographic layer diffracts a second portion of the light (e.g., a sub-portion of the un-diffracted light toward a second redirection holographic layer or a second extraction holographic layer, such that the second portion propagates in a second propagation direction. The angle between the first and second directions can be larger than or equal to one-hundred twenty-degrees (e.g., one-hundred eighty degrees). To equalize the brightness of the first portion and the second portion, the light source can be laterally offset from the injection holographic layer. The lateral offset can be in the second direction. For example, the second portion propagates along an x-axis, and the light from the light engine is received along the z-axis. In this example, the lateral offset can be a distance along the x-axis such that the light engine is not positioned on the x-axis at a center of the injection holographic layer or, equivalently, such that that the light is not injected at an equal distance between the two redirection holographic layers or two extraction holographic layers. Additionally, or alternatively, a reflective optical component (e.g., a mirror) can be coupled to a surface of the substrate to reflect light that reaches the surface. In this case, reflected light in injected by the injection holographic layer and propagated along the first direction and/or second direction.

To illustrate, consider an example of an augmented reality device that implements an optical system of the present disclosure. The augmented reality device can be glasses that include a light projector and a bi-ocular waveguide. A substrate of the bi-ocular waveguide is coupled to an injection holographic layer, two redirection holographic layers, and two extraction holographic layer. The injection holographic layer is centered between the two redirection holographic layers, and the two redirection holographic layers are at the same distance from the injection holographic layer. A first optical element of the injection holographic layer (e.g., a first volume holographic optical element, a first surface relief grating, or a first portion of a multiplexed hologram) receives light incident from the light projector. The first optical element injects a first portion of the light into the waveguide substrate for propagation in a first direction toward a first redirection holographic layer. A remaining portion of the light may not be diffracted by the first optical element. A second optical element of the injection holographic layer can receive this remaining portion and diffract a second portion thereof (or, possibly the remaining portion in its entirety) into the waveguide substrate towards in a second direction toward the second redirection holographic layer. An angle between the first direction and the second direction is about one-hundred eighty degrees. The first redirection holographic layer redirects the first portion of the light towards the first extraction holographic layer. Similarly, the second redirection holographic layer redirects the second portion of the light towards the second extraction holographic layer. Each of the two extraction holographic layers extracts the corresponding light portion as output light for viewing by a user. The display light engine can be laterally offset from the injection holographic layer along the second direction (e.g., the display light engine is closer in distance to the second redirection holographic layer), such that the brightness of the two portions can be the same. In addition, an optical mirror can be coupled to a surface of the bi-ocular waveguide, so that light outcoupled, e.g., what remains of the light after the second portion is injected by the second optical element can be reflected back toward the optical elements. Here, the second optical element diffracts a first portion of the reflected light in the first direction (rather than the second direction). A remaining portion of the reflected light reaches the first optical element. In turn, the first optical element diffracts a second portion of the reflected light in the second direction (rather than the first direction).

Embodiments of the present disclosure provide several technical advantages over conventional optical waveguide systems. For instance, for conventional bi-ocular systems, light diffracted in one direction by an injection holographic element may be brighter than light diffracted in another direction. Thus, the images corresponding to the lights extracted from the extraction holographic layers can have different brightness levels. In addition, light diffracted by one input coupler may be outcoupled by another input coupler, reducing the efficiency of the bi-ocular waveguide. The bi-ocular system of the present disclosure includes an offset between a light source and the injection holographic layer to equalize the brightness of the light in both directions, or minimize the difference in brightnesses, and provide improved field of view uniformity. In addition, a reflective component may be included at the output surface of the substrate that reflects any outcoupled light to further improve the efficiency of the optical waveguide.

As used herein, the terms "light" and "optical" are used in their customary ordinary meaning and refer to electromagnetic wave having a wavelength within the visible region of the optical spectrum and, optionally, within a region that neighbors the visible region (a flanking region). Also as used herein, the term "hologram" is used in their customary ordinary meaning and refers to a diffraction pattern-produced by a spatially split coherent beam of radiation (such as a laser beam) in a layer of an optical material. The term "holographic layer" refers to a layer of material containing a hologram recorded therein (in a body or thickness of the layer) and/or as a surface modulation (surface relief) of such layer.

FIG. 1 illustrates an example of a mixed reality device that implements an optical waveguide of a bi-ocular system in accordance with an embodiment of the disclosure. In the example of FIG. 1, the mixed reality device is illustrated as an augmented reality (AR) device 108. However, other types of mixed reality devices are likewise possible, such as heads up displays (HUDs), holographic devices, and the like. Generally, a mixed reality device enables combining images from different sources via an optical waveguide combiner. One source can be the real world, whereby these images are real-world images. Another source can be a virtual world, whereby these images are virtual (or digital) images. A waveguide combiner projects virtual images and allows a viewer to see through the real world for AR and heads-up display (HUD) applications. The waveguide combiner offers the possibility to extend the eye box without sacrificing the field of view. The eye box is the region where the viewer sees the image, and the field of view is the angular extent (size) of the image.

Referring to FIG. 1, the AR device 108 (e.g., its optical combiner) can combine the real-world images with the virtual images. The real-world images can be perceived through a see-through lens of the AR device 108. The virtual images can be formed based on light emission from a light projector.

The AR device 108 may include a waveguide, illustrated as a bi-ocular optical waveguide system 110 in FIG. 1 and in other figures, although the embodiments can similarly and equivalently apply to other types of waveguides. The bi-ocular optical waveguide system 110 (or at least the optical waveguide) can span the entirety of a face shield of the AR device 108 or a portion thereof. In an example, the bi-ocular optical waveguide system 110 includes an optical waveguide substrate 118 that propagates a light beam between a light injection surface and a light extraction surface. Although not illustrated in FIG. 1, the optical waveguide substrate 118 can be optically coupled to a light source, where this light source can be positioned at an offset relative to an injection holographic layer 112 according to the present disclosure.

In an example, the bi-ocular optical waveguide system 110 includes the injection holographic layer 112 coupled to the light injection surface. The injection holographic layer 112 can receive the light beam from the light source along a light projection axis and diffract the light beam into the optical waveguide substrate 118. The light beam can propagate within the optical waveguide substrate 118 by total internal reflection (TIR) along a first direction until reaching a redirection holographic layer 114 that is coupled to the optical waveguide substrate 118. The redirection holographic layer 114 can redirect the light beam along a second direction, different from the first direction, towards the light extraction surface as a redirected light beam. The light beam can continue propagating within the optical waveguide substrate 118 by total internal reflection until reaching an extraction holographic layer 116 that is coupled to the light extraction surface and extracts the light beam from the optical waveguide substrate 118 as an output light beam. The output light beam can represent an image. In FIG. 1, two redirection holographic layers are shown (each labeled using the numeral "114"). Two extraction holographic layers are also shown (each labeled using the numeral "118"). By using a single light source and a single injection holographic layer 112, the two redirection holographic layer, and the extraction holographic layers, it is possible to form the bi-ocular optical waveguide system 110 such that light can be injected at a same injection point and extracted from two different extraction points to project the same image to each user eye. In this case, the injection holographic layer 112 (e.g., a first optical element thereof) is configured to diffract a first portion of the light beam in a first propagation direction towards the first redirection holographic layer. Further, the injection holographic layer 112 (e.g., a second optical element thereof) is configured to diffract a second portion of the light beam in a second propagation direction towards the redirection holographic layer. In one use case, the propagation directions are parallel to and opposite of each other. In other use cases, the angle between these two propagation directions is at least one-hundred twenty degrees.

In an example, illustrated in FIG. 1 by diagonally shading the injection holographic layer 112, the light source is positioned at a lateral offset relative to the injection holographic layer 112 (e.g., the lateral offset being along the first or second propagation direction). In this example or in a different example, also illustrated in FIG. 1 by diagonally shading the injection holographic layer 112, the bi-ocular optical waveguide system 110 can include a reflective material, such as a mirror or a dielectric mirror, coupled to a surface of the optical waveguide substrate 118. The light beam not diffracted by the optical elements of the injection holographic layer 112 can be reflected back by the reflective material the injection holographic layer 112. The optical elements of the injection holographic layer 112 can then diffract portions of the reflected light beam such that these portions are also directed towards the redirection holographic layers, as described in further detail herein below.

Herein, light and light beam are interchangeably used. Light ray refers to a ray of a light beam. Various figures herein below illustrate the propagation of a light ray in one or more directions. The light beam can be formed by multiple rays (that may or may not be parallel to the light ray and/or to each other). The general, overall, or collective propagation direction(s) of the light beam corresponds to the propagation direction(s) of the light ray.

In various embodiments of the present disclosure, an injection holographic layer is described as including two optical elements. However, the embodiments are not limited as such. For example, an injection holographic layer may include more than two optical elements, each configured to diffract light in a different propagation direction. In another example, an injection holographic layer can include a single optical element configured to diffract light in a propagation direction. In this example, multiple injection holographic layers can be arranged (e.g., in a stack) such that light propagation is achieved in two or more propagation directions.

Figure 2:
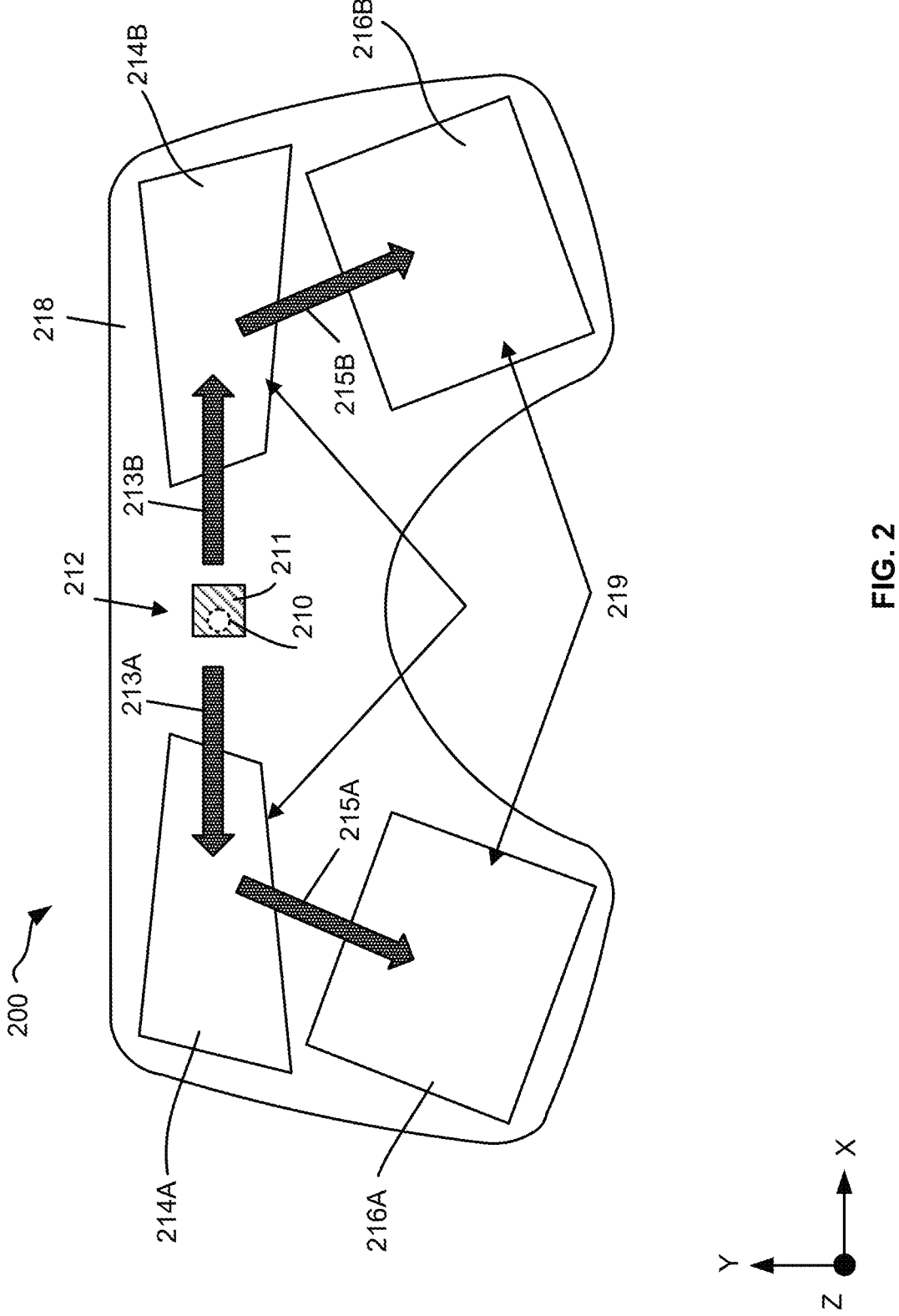
FIG. 2 illustrates an example of a bi-ocular system in accordance with an embodiment of the present disclosure.

FIG. 2 illustrates an example of a bi-ocular system 200 in accordance with an embodiment of the present disclosure. The bi-ocular system 200 includes an injection holographic layer 212, redirection holographic layers 214A-214B, and extraction holographic layers 216A-216B. Each of the injection holographic layer 212, the redirection holographic layers 214A-214B, and the extraction holographic layers 216A-216B are coupled to a substrate 218.

In an example, the injection holographic layer 212 includes multiple (e.g., two or more) optical elements, which may be volume holographic optical elements, surface relief gratings, or portions of a multiplexed hologram. A display light engine 210 (shown with a dotted circle) emits light that represents an image, and the light is received at a first surface of the substrate 218. The display light engine 210 and display light engines described in other figures are examples of a light source. Generally, the light source emits light that represents virtual imagery. Examples of the light include, in addition to the display light engine, a light projector, a laser emitter, etc. Although the display light engine 210 appears to be above the injection holographic layer 212, this is just for simplicity, and the display light engine 210 is below the injection holographic layer 212. "Above" and "below" refer to the light propagation axis (which corresponds to the z-axis in FIG. 2). Particularly (and assuming an origin point belonging to the injection holographic layer 212, "above" refers to a point having a positive value on the light propagation axis (e.g., a positive z-value). In comparison, "below" refers to a point having a negative value on the light propagation axis (e.g., a negative z-value). In FIG. 2, the display light engine 210 is positioned below the injection holographic layer 212 along the z-axis. The injection holographic layer 212 and the display light engine 210 are relatively positioned such that an offset exists between a reference point of the injection holographic layer 212 and a reference point of the display light engine 210. In an example, each reference is a center point. In this example, the optical axis of the display light engine 210 does not intersect the center point of the injection holographic layer 212. As illustrated, the display light engine 210 is offset in the x-direction. The injection holographic layer 212 can inject the light into the substrate 218 as an injected light. A first optical element of the injection holographic layer 212 can diffract a first portion of the injected light at a first diffraction angle such that the first portion propagates within the substrate 218 in a first propagation direction 213A (e.g., a negative x-direction). A second optical element of the injection holographic layer 212 can diffract a second portion of the injected light (e.g., a portion of light not diffracted by the first optical element) at a second diffraction angle such that the second portion propagates within the substrate 218 in a second propagation direction 213B (e.g., positive x-direction). The diffraction angles may be the same, so the propagation directions may be parallel and opposite each other. Although it is possible that the angle formed by the first direction and the second direction is larger than or equal to one-hundred twenty degrees.

A reflective material 211 is coupled to a second surface of the substrate 218. The reflective material 211 is positioned above the injection holographic layer 212 (e.g., overlaps in the x and y directions with the injection holographic layer 212 but is offset in the z direction). It is possible that the reflective material 211 is directly coupled to the injection holographic layer 212 or that a distance exists between the reflective material 211 and the injection holographic layer 212. Not all injected light is diffracted by the optical elements of the injection holographic layer 212. Instead, a portion is outcoupled from the injection holographic layer 212. This portion is reflected by the injection holographic layer 212 toward the injection holographic layer 212. The second optical element can then diffract a first portion of the reflected light such that the first portion of the reflected light propagates within the substrate 218 in the first propagation direction 213A. In addition, the first optical element can diffract a second portion of the reflected light such that the second portion of the reflected light propagates within the substrate 218 in the second propagation direction 213B.

In an example, the redirection holographic layer 214A redirects the first portion of the injected light and the first portion of the reflected light as a third portion propagating in a third propagation direction 215A (e.g., within the x-y plane). The extraction hologram 216A then extracts the third portion as a fifth portion representing the image propagating in a fifth propagation direction (e.g., within the x-y plane) towards a user eye (or along an axis where a user eye can be positioned). In addition, the redirection holographic layer 214B redirects the second portion of the injected light as a fourth portion propagating in a fourth propagation direction 215B (e.g., within the x-y plane). The extraction hologram 216B then extracts the fourth portion as a sixth portion representing the image propagating in a sixth propagation direction (e.g., within the x-y plane) towards a user eye (or along an axis where a user eye can be positioned). In the illustration of FIG. 2, the fifth propagation direction 215A intersects with the sixth propagation direction 215B at an intersection point 219 (e.g., the point in the x-y plane where the user eye can be positioned). However, the fifth propagation direction 215B and the sixth propagation direction 215B can be parallel to each other (e.g., for a projection at infinity, as in the case of heads-up displays, for example). In both cases, due to the offset of the display light engine 210 and the presence of the reflective material 211, the fifth portion and the sixth portion can have a same brightness level.

Figure 3:
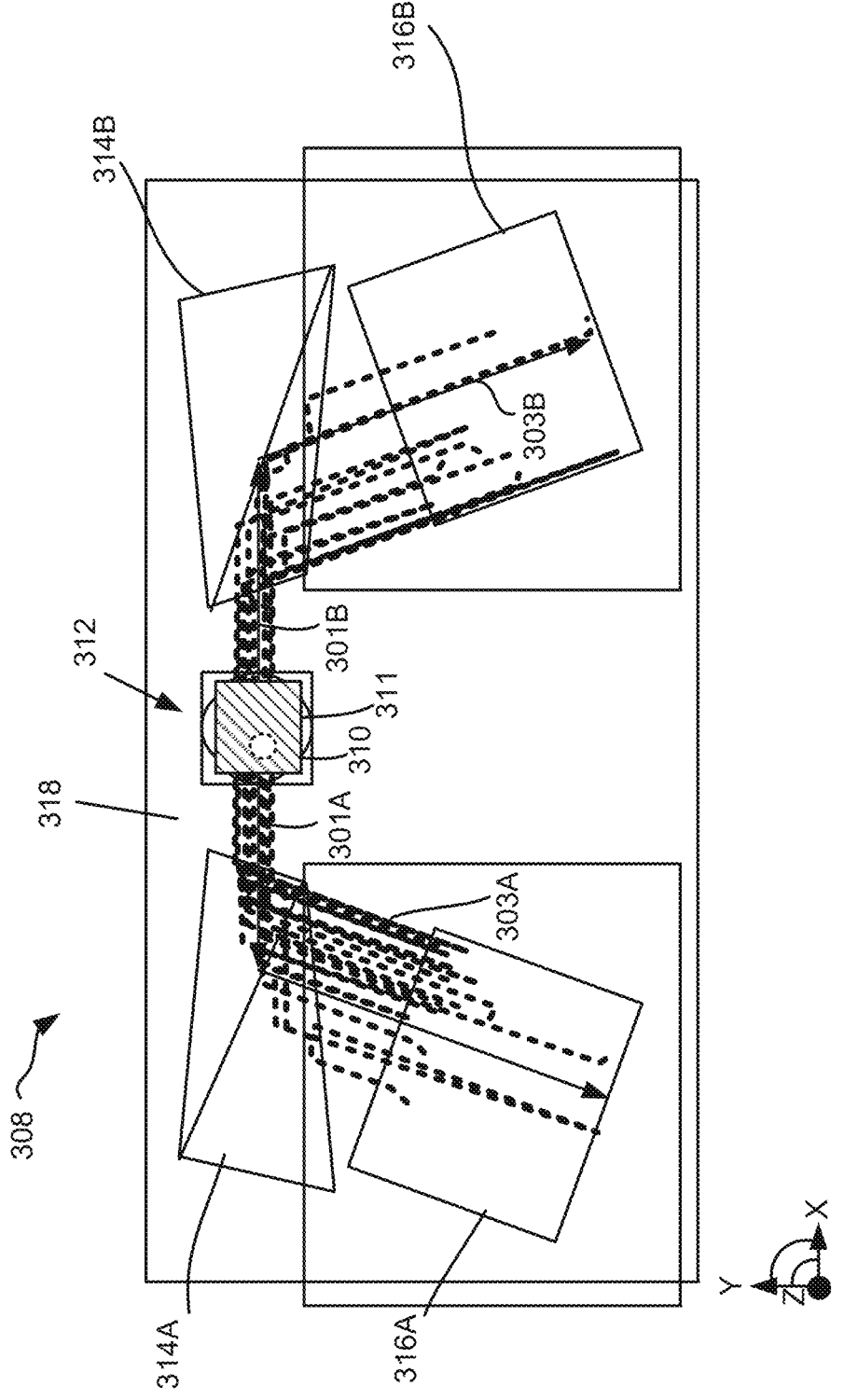
FIG. 3 illustrates an example of ray tracing for a bi-ocular system in accordance with an embodiment of the present disclosure.

FIG. 3 illustrates an example of ray tracing for a bi-ocular system 300 in accordance with an embodiment of the present disclosure. The bi-ocular system 300 is an example of the bi-ocular system 200 in FIG. 2. The bi-ocular system 300 includes an injection holographic layer 312, redirection holographic layers 314A-314B, and extraction holographic layers 316A-316B. Each of the injection holographic layer 312, the redirection holographic layers 314A-314B, and the extraction holographic layers 316A-316B are coupled to a substrate 318.

In an example, the injection holographic layer 312 includes multiple (e.g., two) optical elements, which may be volume holographic optical elements, surface relief gratings, or portions of a multiplexed hologram. A display light engine 310 emits light that represents an image, and the light is received by a first surface of the substrate 318. Although the display light engine 310 appears to be above the injection holographic layer 312, this is just for simplicity, and the display light engine 310 is below the injection holographic layer 312. The injection holographic layer 312 and the display light engine 310 are positioned such that a lateral offset exists between a center point of the injection holographic layer 312 and a center point of the display light engine 310. As illustrated, the display light engine 310 is offset in the x-direction. The injection holographic layer 312 can inject light rays into the substrate 318 as injected light rays. A first optical element of the injection holographic layer 312 can diffract a first portion of an injected light ray such that the first portion propagates within the substrate 318 in a first propagation direction 301A (e.g., a negative x-direction). A second optical element of the injection holographic layer 312 can diffract a second portion of the injected ray such that the second portion propagates within the substrate 318 in a second propagation direction 301B (e.g., positive x-direction). The propagation directions may be parallel and opposite each other. Other injected light rays can be similarly propagated. In particular, a first portion of each injected light ray can be diffracted in the first propagation direction 301A, whereas a second portion of each injected light ray can be diffracted in the second propagation direction 301B.

The injection holographic layer 312 also includes a reflective material 311 coupled to a second surface of the substrate 318. The reflective material 311 is positioned above the injection holographic layer 312 (e.g., has a positive z coordinate). For each light ray, a remaining portion is outcoupled from the injection holographic layer 312 towards the reflective material 311. This remaining portion is referred to as an outcoupled ray. The reflective material 311 reflects each outcoupled ray as reflected light ray toward the injection holographic layer 312. The second optical element of the injection holographic layer 312 can then diffract a first portion of a reflected light ray such that the first portion of the reflected light ray propagates within the substrate 318 in the first propagation direction 301A. In addition, the first optical element of the injection holographic layer 312 can receive a remaining portion of the reflected ray and can diffract a second portion thereof such that the second reflected light ray portion propagates within the substrate 318 in the second propagation direction 301B. Other reflected light rays can be similarly propagated. In particular, a first portion of each reflected light ray can be diffracted in the second propagation direction 301B, whereas a second portion of each reflected light ray can be diffracted in the first propagation direction 301A.

In an example, the redirection holographic layer 314A redirects light rays received from the injection holographic layer 312 in the first propagation direction 301A as third light rays propagated in a third propagation direction 303A. The extraction hologram 316A then received and extracts the third light rays as a fifth light rays in a fifth propagation direction, where these fifth rays represent the image projected in the fifth propagation direction. In addition, the redirection holographic layer 314B redirects light rays received from the injection holographic layer 312 in the second propagation direction 301B as fourth light rays propagating in a fourth propagation direction 303B. The extraction hologram 316B then received and extracts the fourth light rays as a sixth light rays in a sixth propagation direction, where these sixth light rays represent the image projected in the sixth propagation direction. The fifth propagation direction intersects with the sixth propagation direction such that the image is viewed by a viewer's eye at the intersection. Due to the offset of the display light engine 310 and the presence of the reflective material 311, the fifth light rays and the sixth light rays can have a same brightness when viewed by the viewer's eye.

Figure 4:
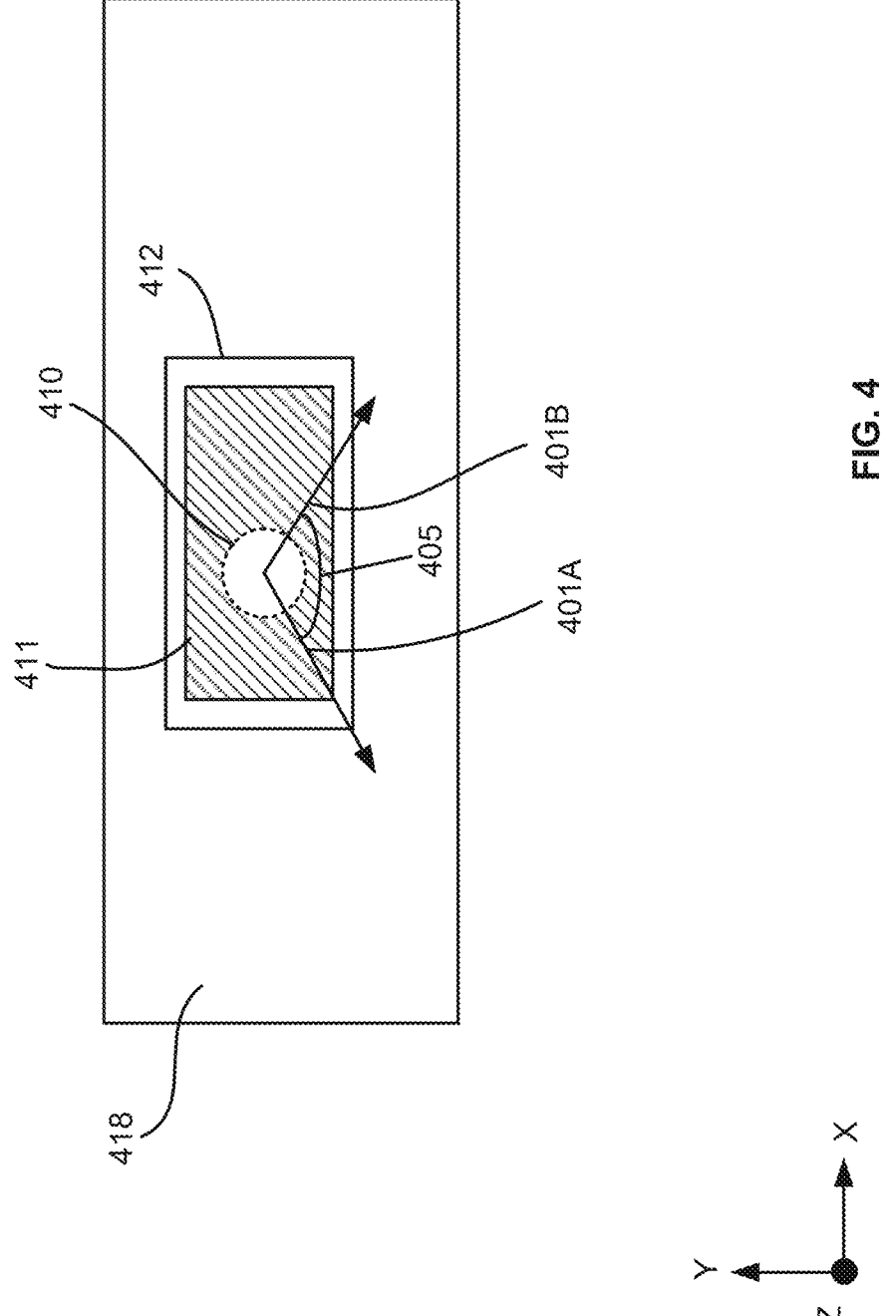
FIG. 4 illustrates an example of an injection holographic layer for a bi-ocular system in accordance with an embodiment of the present disclosure.

FIG. 4 illustrates an example of an injection holographic layer 412 for a bi-ocular system in accordance with an embodiment of the present disclosure. A display light engine 410 (represented by a dotted circle) that is positioned below the injection holographic layer 412 emits light representing an image along an image propagation axis (e.g., the z-axis in FIG. 4) towards the injection holographic layer 412. The injection holographic layer 412 receives the emitted light and injects the light into a substrate 418 to which the injection holographic layer 412 is coupled.

In an example, the injection holographic layer 412 diffracts a first portion 401A of the injected light such that the first portion 401A propagates within the substrate 418 in a first propagation direction. The injection holographic layer 412 also diffracts a second portion 401B of the injected light such that the second portion 401B propagates within the substrate 418 in a second propagation direction. An angle 405 between the first propagation direction and the second propagation direction is larger than or equal to one-hundred twenty degrees. In FIG. 4, the angle is illustrated as being one-hundred twenty degrees.

A reflective component 411 reflects a remaining portion of the injected light as reflected light. The injection holographic layer 412 then diffracts a first portion of the reflected light such that the first portion of the reflected light propagates within the substrate 418 in the first propagation direction. In addition, the injection holographic layer 412 can diffract a second portion of the reflected light such that the second portion of the reflected light propagates within the substrate 418 in the second propagation direction.

Figure 5:
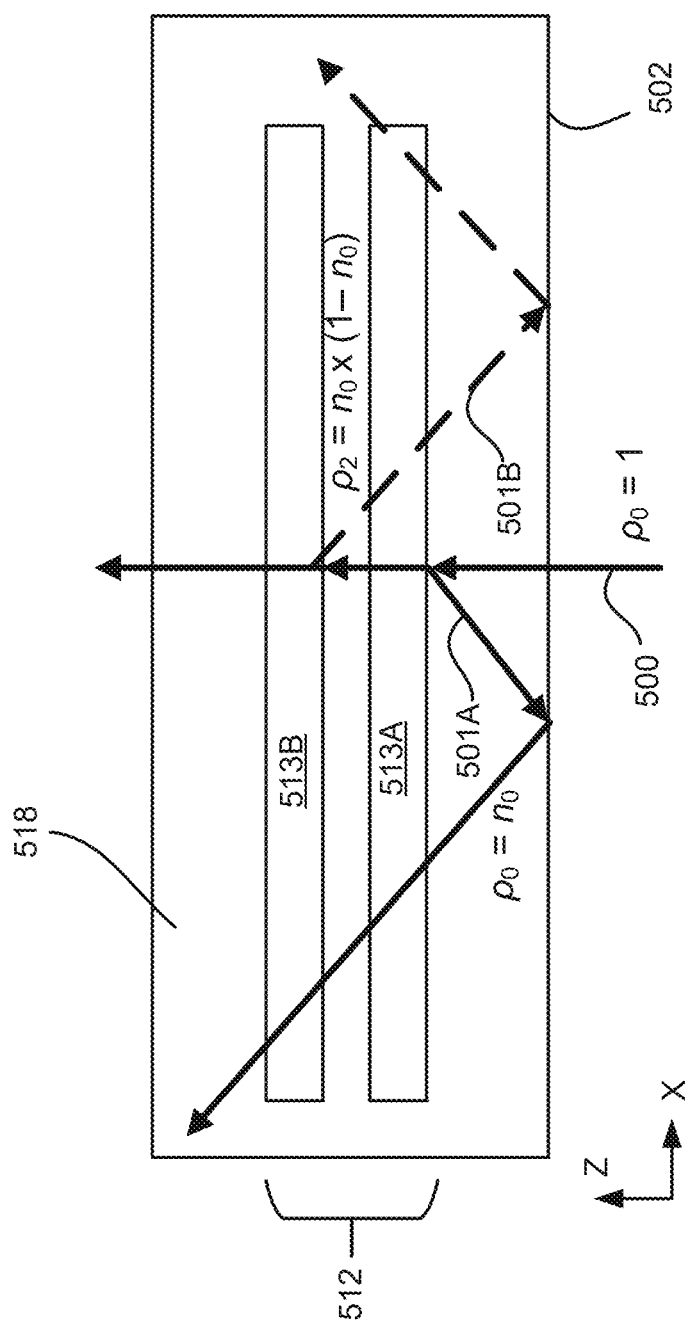
FIG. 5 illustrates an example of an injection holographic layer without an offset relative to display light engine or without a reflective component.

FIG. 5 illustrates an example of an injection holographic layer 512 without an offset relative to display light engine or without a reflective component. The injection holographic layer 512 includes optical elements 513A-513B. In the illustration of FIG. 5, the optical elements 513A-513B can be volume holographic optical elements that are arranged in a stack and that are aligned to have the same center point of the injection holographic layer 512. A light ray 500 is emitted by a display light engine (e.g., display light engine 210 in FIG. 2) towards a first surface 502 of a substrate 518. The optical element 513A receives the light ray 500 and diffracts a first portion 501A of the light ray 500 in a first propagation direction (e.g., negative x-direction in FIG. 5). The remaining portion of the light ray 500 continues propagating towards the optical element 513B, which diffracts a second portion 501B thereof in a second propagation direction (e.g., a positive x-direction in FIG. 5).

In an example, the optical elements 513A-513B are recorded into two films. This recording may lead to unequal brightness for images received by each eye when the display light engine is centered relative to the injection holographic layer 512. FIG. 5 shows this centering by illustrating the light ay as being emitted along the z-axis and arriving at the center x-coordinate of the injection holographic layer 512. As FIG. 5 shows, the optical element 513B diffracts the portion of the light that is not diffracted by the optical element 513A. If the optical elements 513A-513B have the same diffraction efficiency $\eta 0$, the light diffracted by the optical element 513A towards one eye is diffracted according to a diffraction efficiency of $\eta 0$, and the light diffracted by the optical element 513B towards the other eye is diffracted according to a diffraction efficiency of $\eta 0 \times (1-\eta 0)$. As such, the two diffraction efficiencies are different, resulting in different brightness levels. Alternatively, the index modulation of each of the optical elements 513A-513B can be adjusted by adjusting the exposure dosage to produce different efficiencies for the two optical elements. However, this can lead to an imbalance in the field of view size, image uniformity and luminance imbalance between the left eye and right eye.

Figure 6:
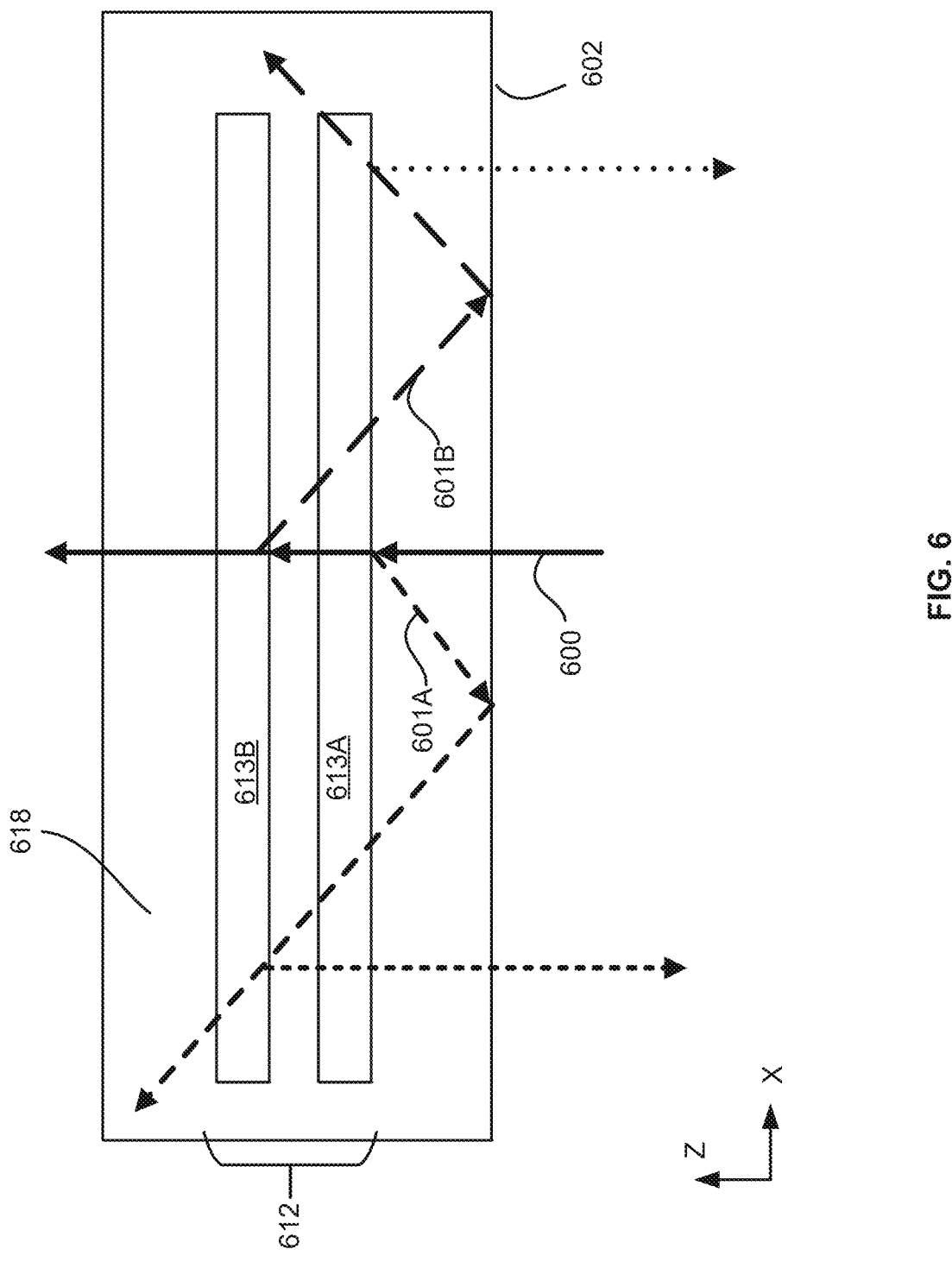
FIG. 6 illustrates another example of an injection holographic layer without an offset relative to display light engine or without a reflective component.

FIG. 6 illustrates another example of an injection holographic layer 612 without an offset relative to display light engine or without a reflective component. The injection holographic layer 612 includes optical elements 613A-613B, which may be volume holographic optical elements in the illustration of FIG. 6. A light ray 600 is emitted by a display light engine (e.g., display light engine 210 in FIG. 2) towards a first surface 602 of a substrate 618. Optical element 613A receives the light ray 600 and diffracts a first portion 601A thereof in a first propagation direction (e.g., a negative x-direction in FIG. 6). A remaining portion of the light ray 600 continues propagating towards the optical element 613B, which diffracts a second portion 601B thereof in a second propagation direction (e.g., a positive x-direction in FIG. 6).

In an example, the optical elements 613A-613B can significantly counteract each other. As one of the optical elements 613A-613B diffracts the light ray 600 into the total internal reflection mode, the other may be able to diffract a significant portion of that light back out of total internal reflection mode and out of the substrate 618. FIG. 6 illustrates this phenomenon, where the outcoupled light counts as loss in the system. In the most extreme case, where the two diffraction planes overlap, the optical elements 613A-613B significantly counteract each other, resulting in a loss of more than forty percent for example.

Figure 7:
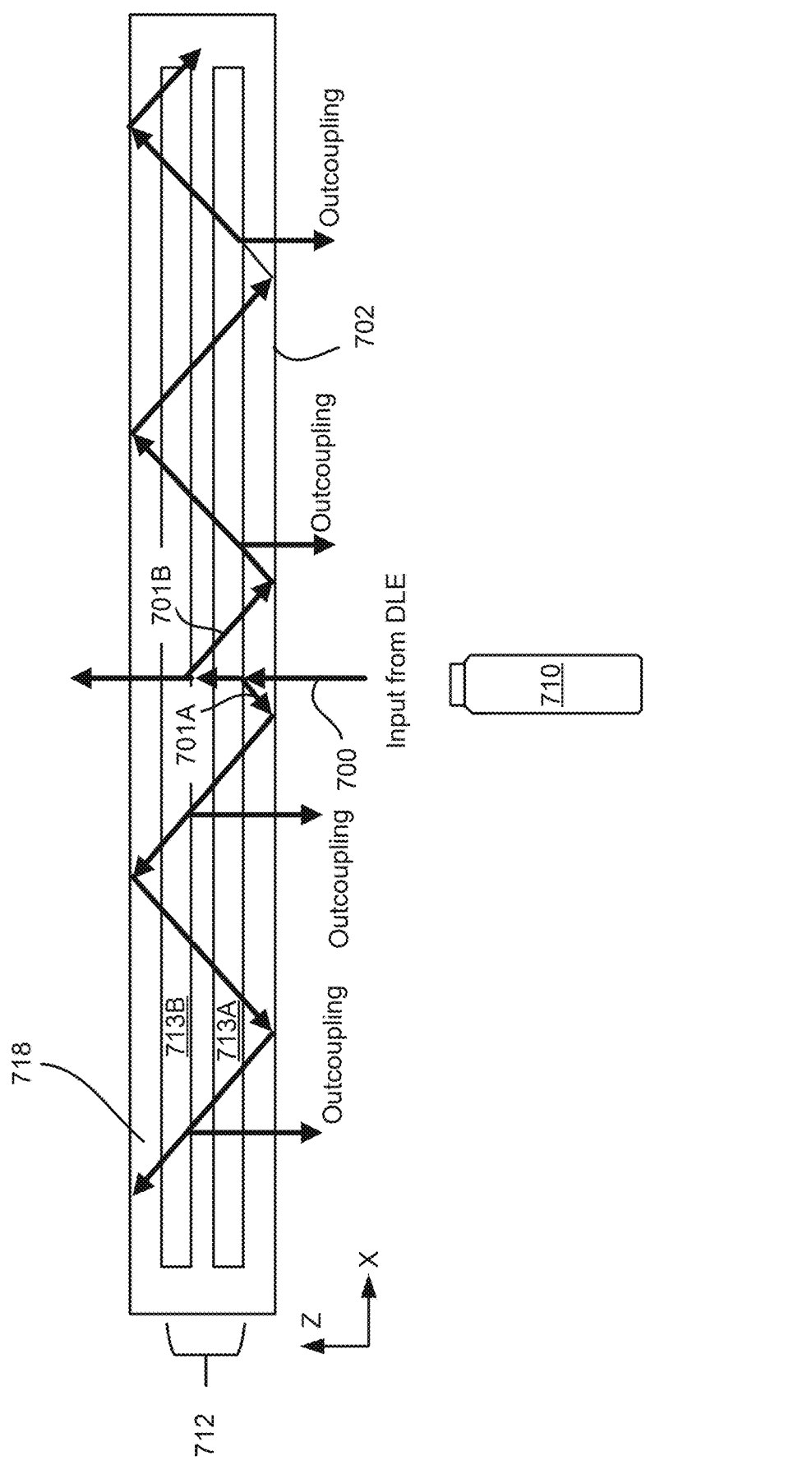
FIG. 7 illustrates another example of an injection holographic layer without an offset relative to display light engine or without a reflective component.

FIG. 7 illustrates another example of an injection holographic layer 712 without an offset relative to display light engine or without a reflective component. The injection holographic layer 712 includes optical elements 713A-713B, which may be volume holographic optical elements in the illustration of FIG. 7. A light ray 700 is emitted by a display light engine 710 towards a first surface 702 of a substrate 718. Optical element 713A receives the light ray 700 and diffracts a first portion 701A thereof in a first propagation direction (e.g., a negative x-direction in FIG. 7). A remaining portion of the light ray 700 continues propagating towards the optical element 713B, which diffracts a second portion 701B thereof in a second propagation direction (e.g., a positive x-direction in FIG. 7).

With a center point of the display light engine 710 aligned with a center point of the injection holographic layer 712, as shown in FIG. 7, the first portion 701A and the second portion 701B may experience a same number of bounces before being output to or received by redirection holographic layers. Since the first portion 701A is diffracted from the full light ray 700 and the second portion 701B is diffracted only from a remaining portion of the light ray 700, the first portion 701A may be brighter than the second portion 701B. As such, when the first portion 701A and the second portion 7101B are ultimately extracted, the image viewed by a left eye may be brighter than an image viewed by a right eye. The outcoupling of the first portion 701A by the optical element 713B and the outcoupling of the second portion 701B by the optical element 713A, which typically count as loss in the system as described in FIG. 6, may be taken advantage of to equalize the efficiency or the image brightness. This is further described herein below.

Figure 8:
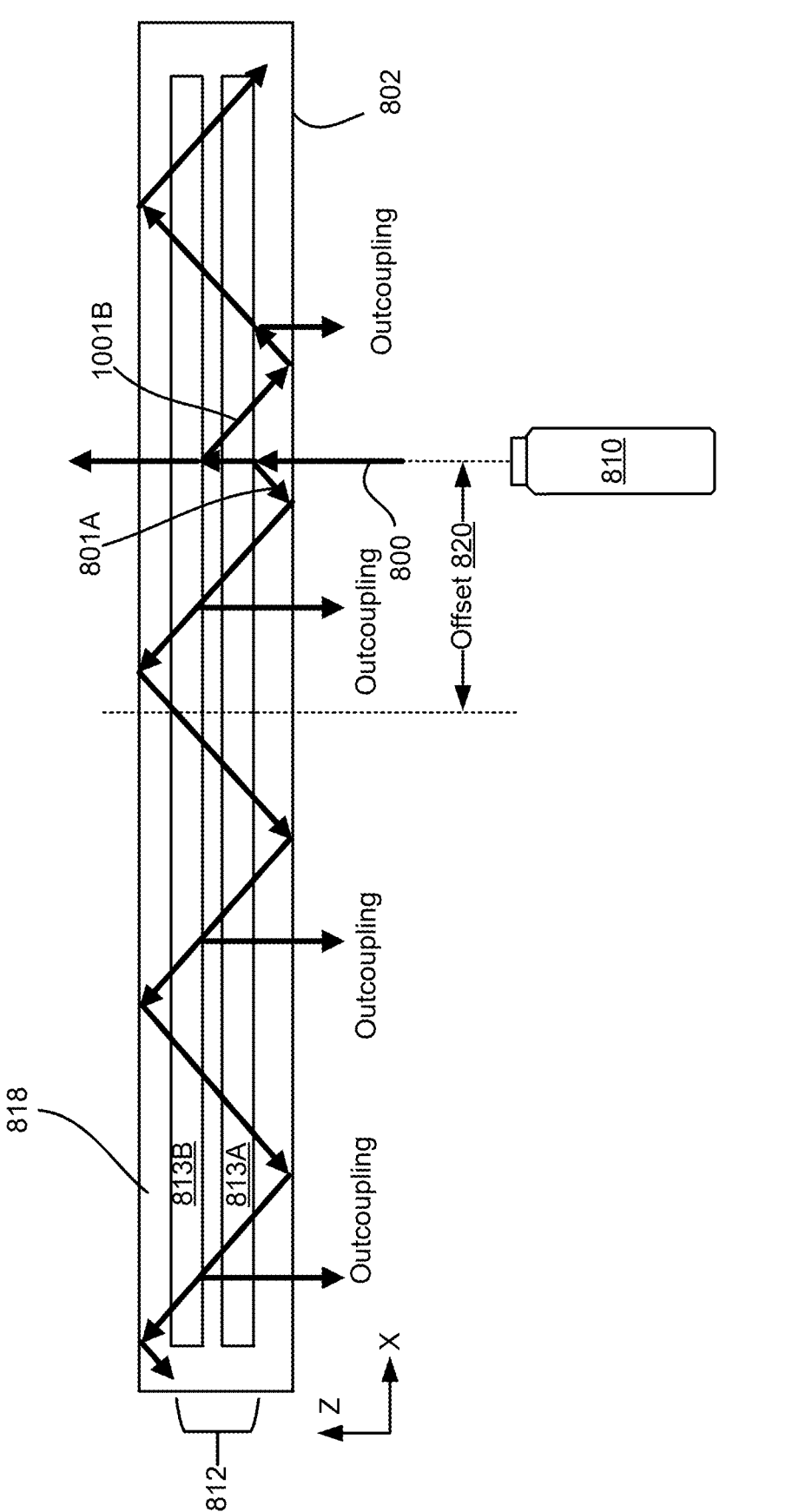
FIG. 8 illustrates an example of a display light engine being offset from an injection holographic layer in accordance with an embodiment of the present disclosure.

FIG. 8 illustrates an example of a display light engine 810 being offset from an injection holographic layer 812 in accordance with an embodiment of the present disclosure. The injection holographic layer 812 includes optical elements 813A-813B. In the illustration of FIG. 8, the optical elements 813A-813B can be volume holographic optical elements that are arranged in a stack (e.g., in the z-direction) and that are aligned to have the same center point of the injection holographic layer 812. Other configurations of the injection holographic layer 812 are possible, such as one including a stack of surface relief gratings, a multiplexed hologram that includes multiple diffraction gratings, or a combination of volume holographic optical element(s), surface relief grating(s) and/or a multiplexed hologram. A light ray 800 is emitted by the display light engine 810 towards a first surface 802 of a substrate 818 and arrives to the first surface 802 along a light injection axis (e.g., along the z-axis, such that the light injection is perpendicular to the first surface 802). Optical element 813A receives the light ray 800 and diffracts a first portion 801A thereof in a first propagation direction (e.g., a negative x-direction in FIG. 8). A remaining portion of the light ray 800 (e.g., not diffracted by the optical element 801A) continues propagating towards the optical element 813B along the light injection axis, which diffracts a second portion 801B thereof in a second propagation direction (e.g., a positive x-direction in FIG. 8).

Figure 13:
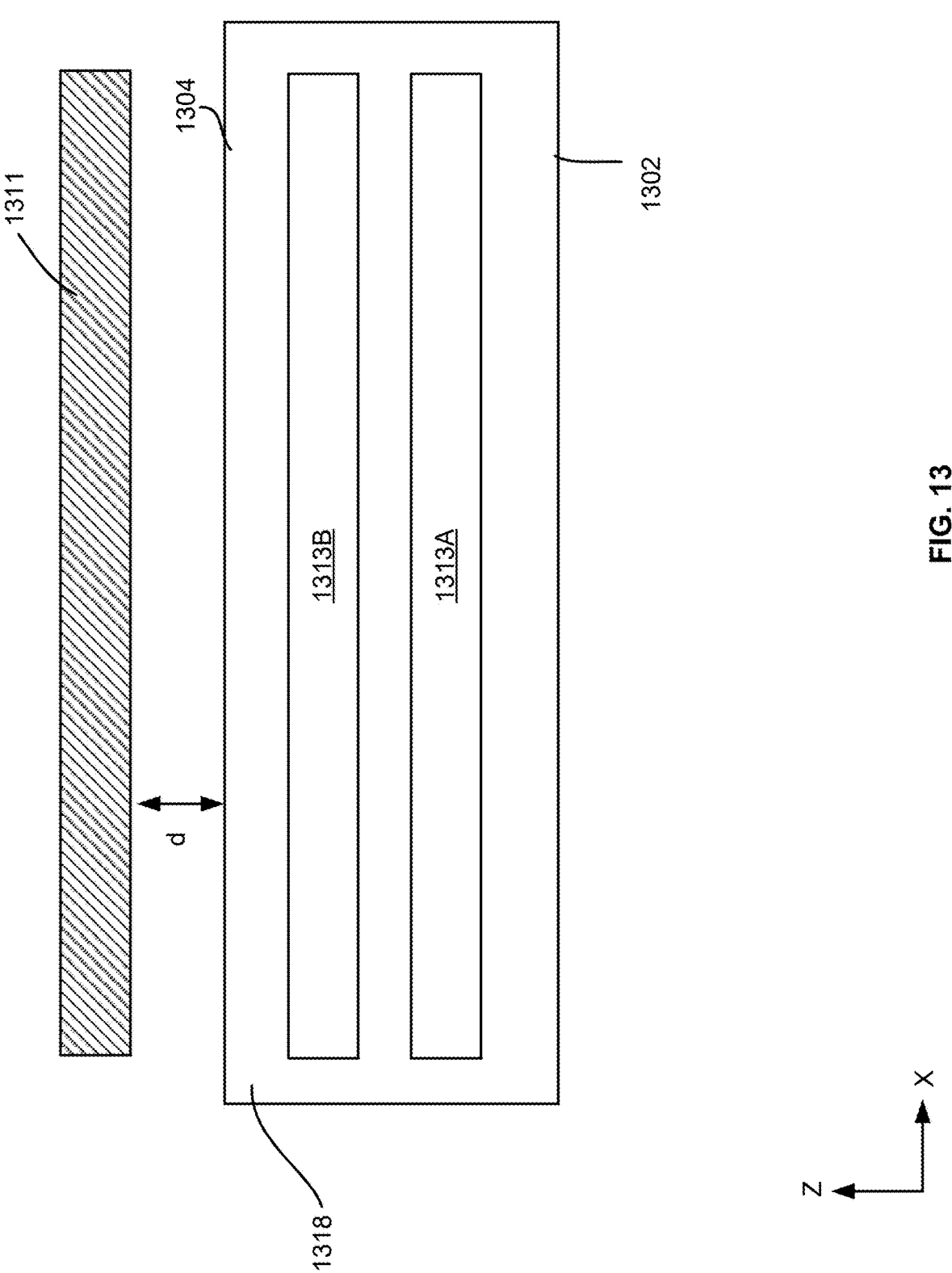
FIG. 13 illustrates an example of a reflective component disposed a distance from a substrate in accordance with an embodiment of the present disclosure.

In an example, as illustrated in FIG. 8, the display light engine 810 is laterally offset from the injection holographic layer 812. In particular, a center point of the display light engine 810 is laterally offset from a center point the injection holographic layer 812 in the second propagation direction (illustrated in FIG. 8 as being in the positive x-direction). The distance between the center point of the display light engine 810 and the center point of the injection holographic layer 812 is shown in FIG. 8 as an offset 820. This offset 820 can be lateral in one of the propagation directions (e.g., the offset 820 is parallel to the second propagation direction). Additionally, or alternatively, the offset 820 can be parallel to a surface of the substrate 818 (e.g., to a first surface 1302 as shown in FIG. 13, corresponding to the surface at which the injected light is received). In FIG. 8, the second propagation direction is parallel to the surface of the substrate 818. Accordingly in this case, the offset 820 is parallel to both the second propagation direction and the surface. However, in other embodiments, the offset direction need not be parallel to the second propagation direction. For example, referring back to FIG. 4, the offset direction while parallel to the surface, can be in XY-plane and need not be parallel to propagation directions 401A and 401B. In this case, the offset 820 can be parallel to one of the second propagation direction or the surface (e.g., can deviate by several degrees from the second propagation direction while being parallel to the surface).

The injection holographic layer 812 has a width defined along a direction parallel to the first propagation direction (e.g., x-direction), and the offset 820 can be within a range of twenty percent of the width (or a smaller percentage, such as ten percent). So, if the width is five mm, then the offset between the display light engine 810 and the injection holographic layer 812 may be within the +/−1 mm of the center point of the injection holographic layer 812. As the first portion 801A continues propagating, the first portion 801A is subject to a first number (e.g., three) of light outcoupling by the optical element 813B. In addition, as the second portion 801B continues propagating, the second portion 801B is subject to a second number (e.g., one) of light outcoupling by the optical element 813A. The first number can be larger than the second number so that the extracted light portions have a same brightness in each propagation direction. That is, light that is output in the first propagation direction has the same brightness as light that is output in the second propagation direction since the light propagating in the first propagation direction is weakened relative to the light propagating in the second propagation direction. Thus, the efficiency of the light in the first propagation direction is reduced.

Figure 9:
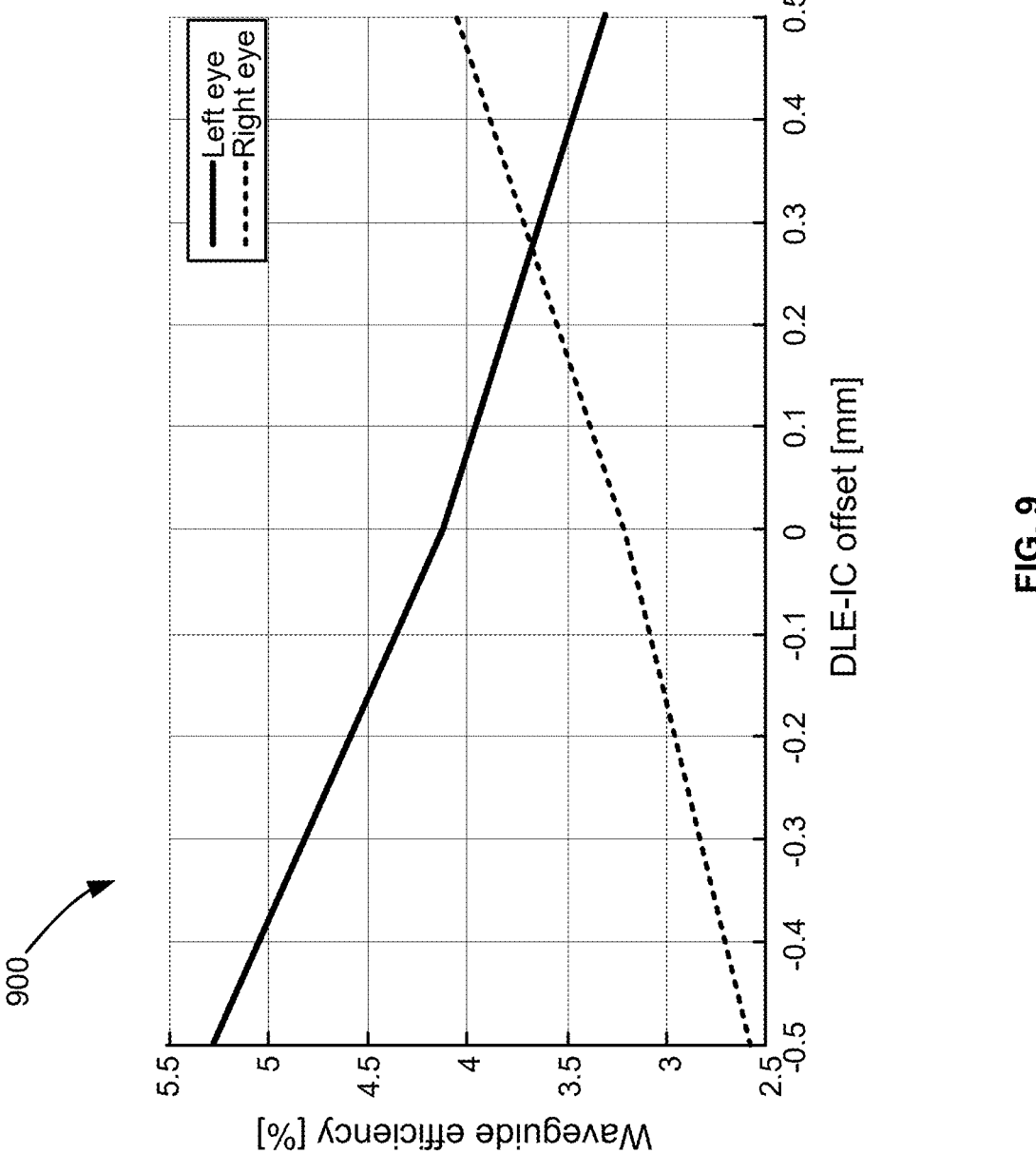
FIG. 9 illustrates a graph showing waveguide efficiency relative to an offset distance between a display light engine and an injection holographic layer according to an embodiment of the present disclosure.

FIG. 9 illustrates a graph 900 showing waveguide efficiency relative to an offset distance between a display light engine and an injection holographic layer according to an embodiment of the present disclosure. The efficiency of light diffracted by the injection holographic layer in two propagation directions, indicated as left eye and right eye is shown. The display light engine having an offset distance less than 0.27 mm from a center line of the injection holographic layer is shown as resulting in the light propagating towards the left eye having a higher efficiency. In addition, the display light engine having an offset distance greater than distance of x=+0.27 mm from a center line of the injection holographic layer is shown as resulting in the light propagating towards the right eye having a higher efficiency. With an offset distance of x=+0.27 mm, the efficiency of light propagating towards the left eye is shown to be equal to the efficiency of light propagating towards the right eye. Thus, the offset distance of x=+0.27 mm produces equal image brightness for each eye.

Figure 10:
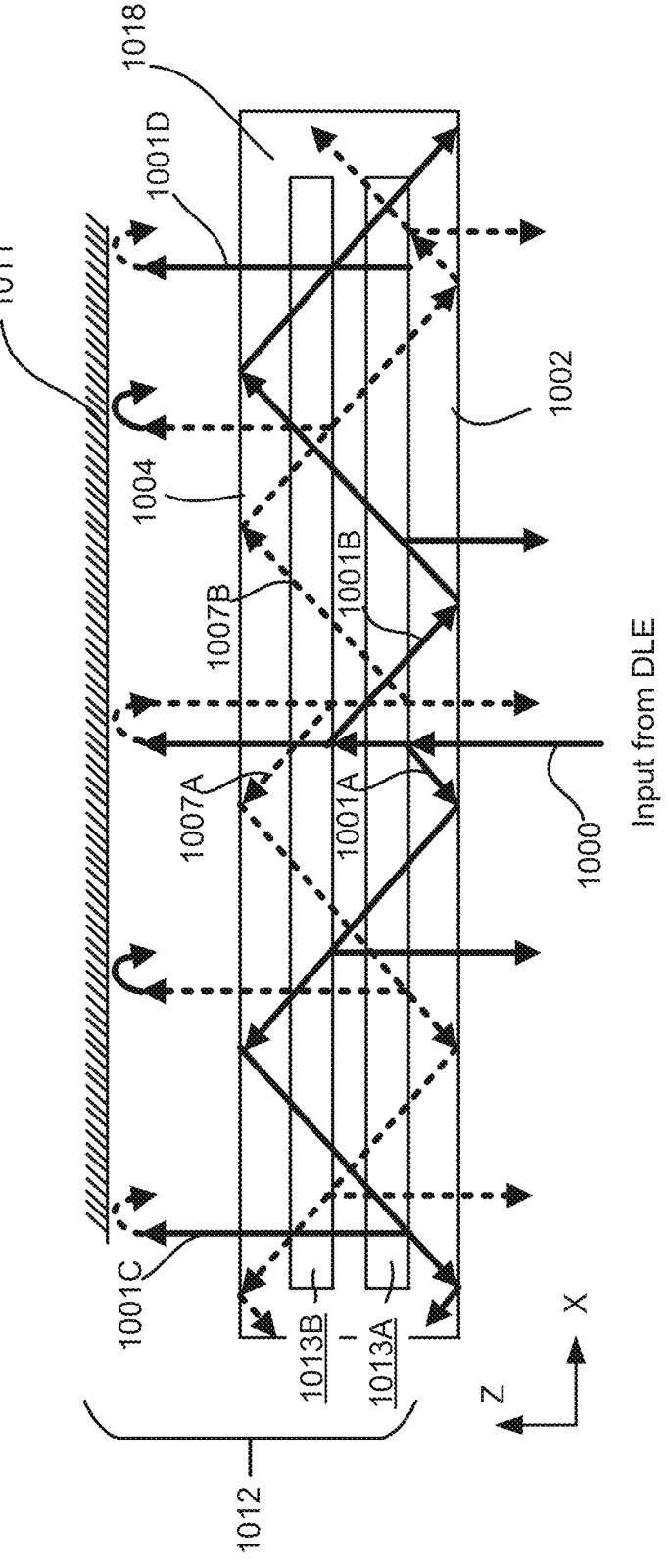
FIG. 10 illustrates an example of an injection holographic layer having a reflective component in accordance with an embodiment of the present disclosure.

FIG. 10 illustrates an example of an injection holographic layer having a reflective component in accordance with an embodiment of the present disclosure. A substrate 1018 has a first surface 1002 and a second surface 1004. The injection holographic layer 1012 is coupled to the substrate 1018 and includes optical elements 1013A-1013B. A reflective component 1011 can be optically coupled directly to the substrate 1018 (e.g., by being attached to, deposited on, etc. the second surface 1004). Or, as illustrated in FIG. 10, the reflective component 1011 can be optically coupled indirectly to the substrate 1018 (e.g., by being positioned parallel to but at a distance along the z-axis from the second surface 1004). The optical elements 1013A-1013B can be volume holographic optical elements that are arranged in a stack and that are aligned to have the same center point of the injection holographic layer 1012 (although other types of optical elements are possible, as described in FIG. 8). A light ray 1000 is emitted by a display light engine towards the first surface 1002 of the substrate 1018 and arrives at the second surface 1002 along a light injection axis (e.g., along the z-axis, such that the light injection is perpendicular to the first surface 1002). Optical element 1013A receives the light ray 1000 and diffracts a first portion 1001A thereof in a first propagation direction (e.g., a negative x-direction in FIG. 10). A remaining portion of the light ray 1000 (e.g., not diffracted by the optical element 1013A) continues propagating along the light injection axis towards the optical element 1013B, which diffracts a second portion thereof in a second propagation direction (e.g., a positive x-direction in FIG. 10). The optical element 1013B may not reflect the remaining portion of the light 100 in its entirety. As such, what remains of the light ray 100 after the diffraction by the optical element 1013B can continue propagation long the light injection axis towards the second surface 1004 and is outcoupled therefrom towards the reflective component 1011.

In an example, the reflective component 1011 reflects a portion or the entirety of the outcoupled light ray as a reflected light ray back toward the second surface 1004. The reflected light ray arrives along the light injection axis (e.g., along the z-axis in a direction opposite to the light ray 1000). The reflective component 1011 may be disposed on the second surface 1004 or may be disposed at a predefined distance away from the second surface 1004 and arranged parallel to the second surface 1004. The injection holographic layer 1012 can diffract the reflected light ray in the first and second propagation directions such that at least portions of the reflected light ray propagate within the substrate 1018. For instance, the optical element 1013B can diffract a first portion 1007A of the reflected light ray such that the first portion 1007A propagates within the substrate 1018 in the first propagation direction. A remaining portion of the reflected light ray (e.g., not diffracted by the optical element 1013B) continues propagating along the light injection axis towards the optical element 1013A, The optical element 1013A can diffract a second portion 1007B of this remaining portion such that the second portion 1007B propagates within the substrate 1018 in the second propagation direction.

The reflective component 1011 is capable of returning the outcoupled light ray directly transmitted through the injection holographic layer 1012 back towards the optical elements 1013A-1013B. In the return trip, the optical elements 1013A-1013B switch roles and each diffracts the reflected light ray in the opposite direction that it did in the first pass. The amount of efficiency increase may be seventy percent when using the reflective component 1011 compared to not using a reflective component. In an example, the reflective component 1011 does not have to be an independent element and can be coated on top of the substrate 1018. Coating the reflective component 1011 directly onto the substrate 1018 can ensures its parallelism with the substrate 1018, which may be relevant to image resolution. This reflective component 1011 can be made out of aluminum, or other metal, or dichroic tuned to the wavelength of the display light engine.

In an example, the optical element 1013A may outcouple a third portion 1001C of the light ray 1000 as outcoupled light toward the second surface 1004. The reflective component 1011 can reflect the third portion 1001C as second reflected light ray toward the second surface 1004. In addition, the optical element 1013B may diffract a portion of the second reflected light such that this portion propagates within the substrate 1018 in the first propagation direction. Here also, the optical element 1013B may outcouple a fourth portion 1001D of the light ray 1000 as outcoupled light toward the second surface 1004. The reflective component 1011 can reflect the fourth portion 1001D as third reflected light toward the second surface 1004 that can then be propagated, at least in part, by the optical elements 1013A-1013B.

In general, with the optical elements 1013A-1013B arranged in a stack, the optical element 1013A receives the light ray 1000, diffracts the first portion 1001A, and passes a third portion toward the optical element 1013B. The optical element 1013B then receives the third portion, diffracts the second portion 1001B of the light 1000, and passes the remaining portion of the light toward the reflective component 1011. The optical element 1013B then receives the reflected light ray and diffracts a first portion of the reflected light ray and passes a remaining portion toward the optical element 1013A that, in turn, diffracts at least a portion thereof.

FIG. 11 illustrates example of average fields of view for a right eye and left eye without and with using a reflective component in accordance with an embodiment of the present disclosure. Graph 1100A corresponds to an overlapping field of view without using a reflective component, and graph 1100B corresponds to an overlapping field of view with using a reflective component. In a particular example, all metrics of the field of view (e.g., left, right, total, and overlap) for a bi-ocular waveguide may increase by one degree when using the reflective component. The uniformity at thirty degrees may also increase by one to two percent points. Visually, as shown in FIG. 11, the combined field of view map looks smoother for the example with the reflective component than the example without the reflective component, especially when viewing the luminance near the center axis. Overall, the reflective provides benefit to the field of view and field of view uniformity in addition to the benefits in efficiency. In addition, adding the reflective component is shown to not introduce any artifacts as long as the reflective component is parallel to the waveguide.

Figure 12:
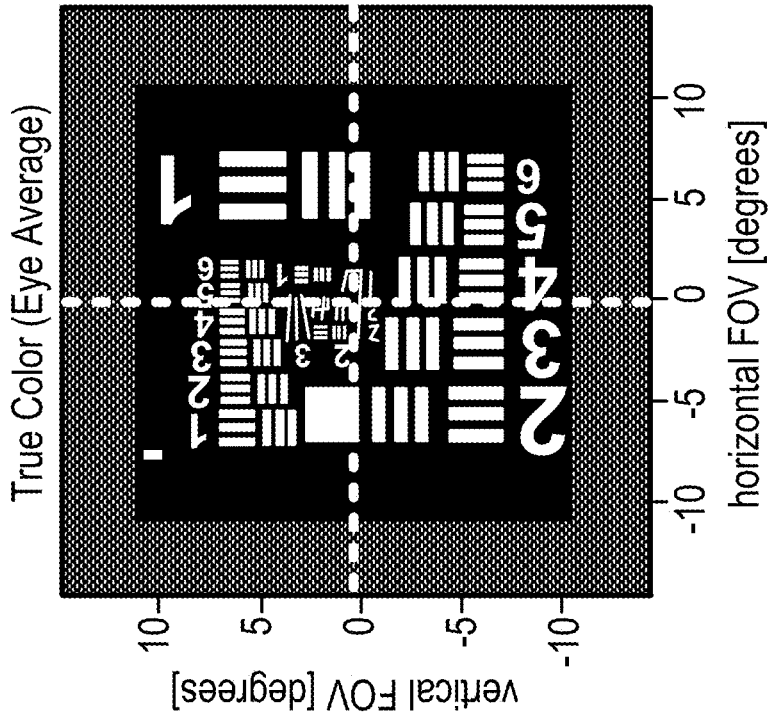
FIG. 12 illustrates an example of a standard resolution target image simulation with a bi-ocular waveguide that uses a reflective component in accordance with an embodiment of the present disclosure.

FIG. 12 illustrates an example of a standard resolution target image simulation with a bi-ocular waveguide that uses a reflective component in accordance with an embodiment of the present disclosure. The image simulation is shown to include an entirety of the target in the field of view. Additionally, the image is bright across the field of view, further illustrating the field of view uniformity with the use of a reflective component.

FIG. 13 illustrates an example of a reflective component 1311 disposed a distance from a substrate 1318 in accordance with an embodiment of the present disclosure. The substrate 1318 has a first surface 1302 and a second surface 1304. Light is received from a display light engine through the first surface 1302 along a light injection axis and is diffracted by optical elements 1313A-1313B of an injection holographic layer (e.g., injection holographic layer 212 in FIG. 2). The injection holographic layer can be disposed in the substrate 1318 (e.g., between the first surface 1302 and the second surface 1304). The light is injected at an angle formed by the first surface 1302 and the light injection axis. In the example of FIG. 13, this angle is ninety degrees. Remaining light, and light outcoupled by the optical elements 1313A-1313B towards the second surface 1304 can be reflected by the reflective component 1311 back to the second surface 1304. The second surface 1304 can receive the reflected light at the same angle at which the first surface 1302 receives the injected light (e.g., ninety degrees in FIG. 13). The distance (d) at which the reflective component 1311 is disposed from the second surface 1304 may be predefined. An optically transparent material (e.g., air or otherwise) can be disposed between the reflective component 1311 and the second surface 1304.

Figure 14:
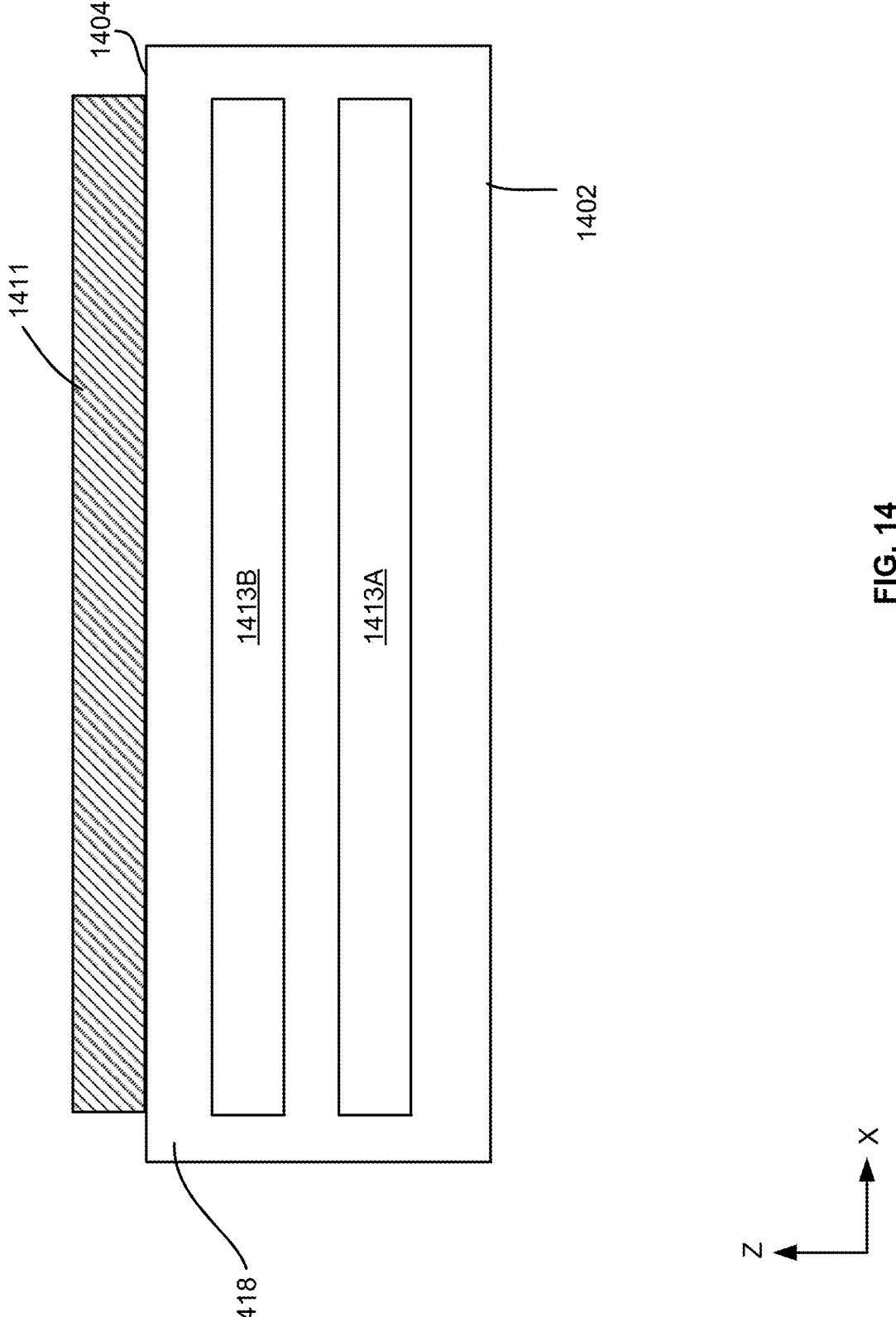
FIG. 14 illustrates an example of a reflective component disposed on a surface of a substrate in accordance with an embodiment of the present disclosure.

FIG. 14 illustrates an example of a reflective component 1411 disposed on a surface of a substrate 1418 in accordance with an embodiment of the present disclosure. The substrate 1418 has a first surface 1402 and a second surface 1404. An injection holographic layer can be disposed in the substrate 1418 (e.g., between the first surface 1402 and the second surface 1404). Light is received from a display light engine through the first surface 1402 along a light injection axis and is diffracted by optical elements 1413A-1413B of the injection holographic layer (e.g., injection holographic layer 212 in FIG. 2). The light is injected at an angle formed by the first surface 1402 and the light injection axis. In the example of FIG. 14, this angle is ninety degrees. Remaining light, and light outcoupled by the optical elements 1413A-1413B towards the second surface 1404 can be reflected by the reflective component 1411 towards the first surface 1402. The second surface 1404 can receive the reflected light at the same angle at which the first surface 1402 receives the injected light (e.g., ninety degrees in FIG. 14). The reflective component 1411 may be a reflective material such as a mirror coated on the second surface 1404.

Figure 15:
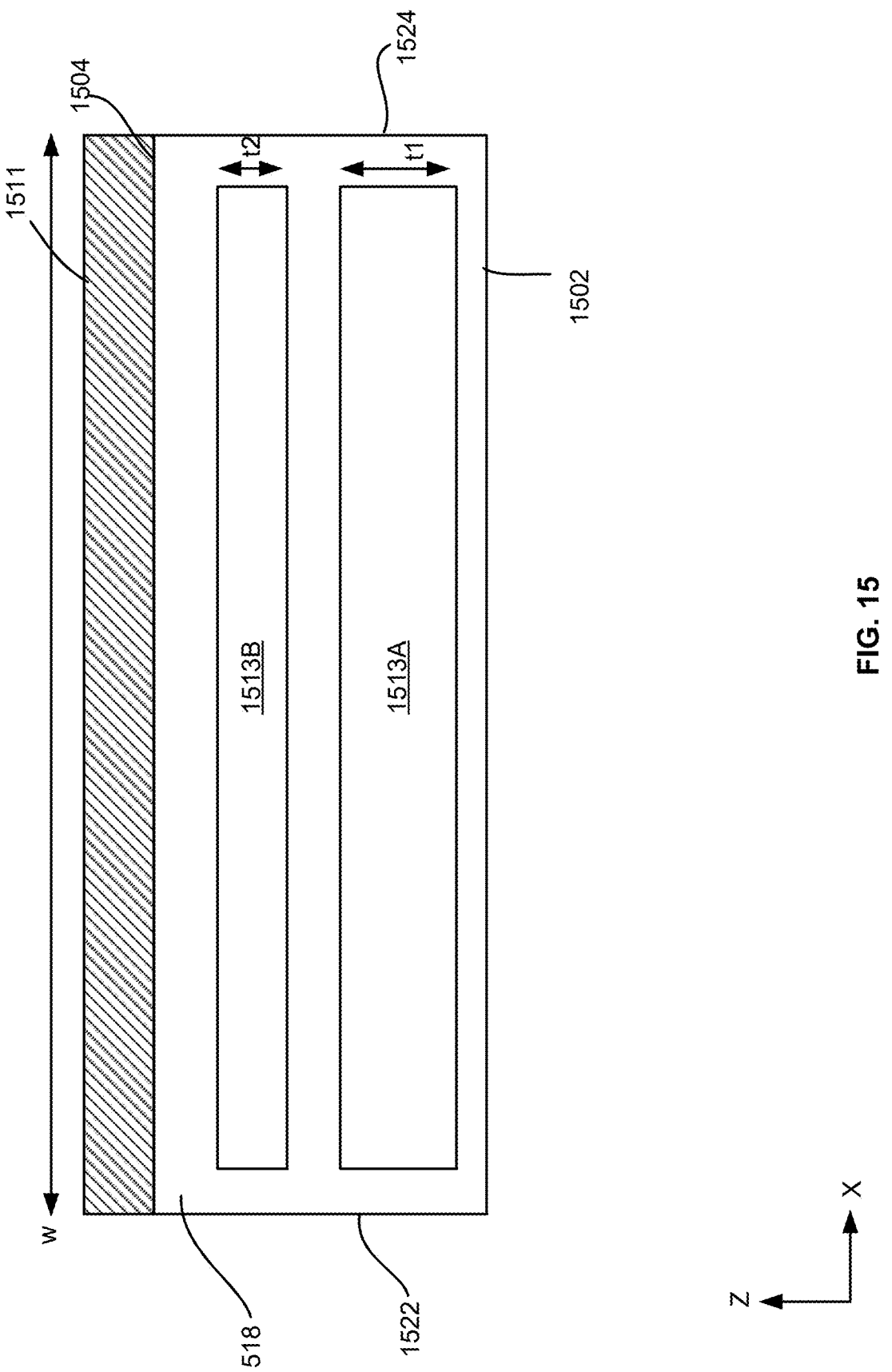
FIG. 15 illustrates an example of a reflective component extending to edges of a substrate in accordance with an embodiment of the present disclosure.

FIG. 15 illustrates an example of a reflective component 1511 extending to edges of a substrate 1518 in accordance with an embodiment of the present disclosure. The substrate 1518 has a first edge 1522, a second edge 1524, a first surface 1502, and a second surface 1504. The reflective component 1511 is a reflective material that is disposed on the second surface 1504 and has a width (w) that extends between the first edge 1522 and the second edge 1524. Alternatively, the reflective component 1511 may only extend to a predefined distance from the first edge 1522 and/or the second edge 1524 (e.g., between the last light bounce on the second surface 1504 and the last light bounce on the first surface 1502).

Light is received from a display light engine through the first surface 1502 and is diffracted by optical elements 1513A-1513B of an injection holographic layer (e.g., injection holographic layer 212 in FIG. 2) disposed within the substrate 1518. Remaining light, and light outcoupled by the optical elements 1513A-1513B towards the second surface 1504 can be reflected by the reflective component 1511 towards the first surface 1502. The optical element 1513A has a first thickness (t1) and optical element 1513B has a second thickness (t2), where the first thickness is illustrated as being larger than the second thickness. In other examples, the second thickness may be larger than the first thickness, or they may be the same thickness. In addition, the index modulation of the optical element 1513A may differ from the index modulation of the optical element 1513B.

Figure 16:
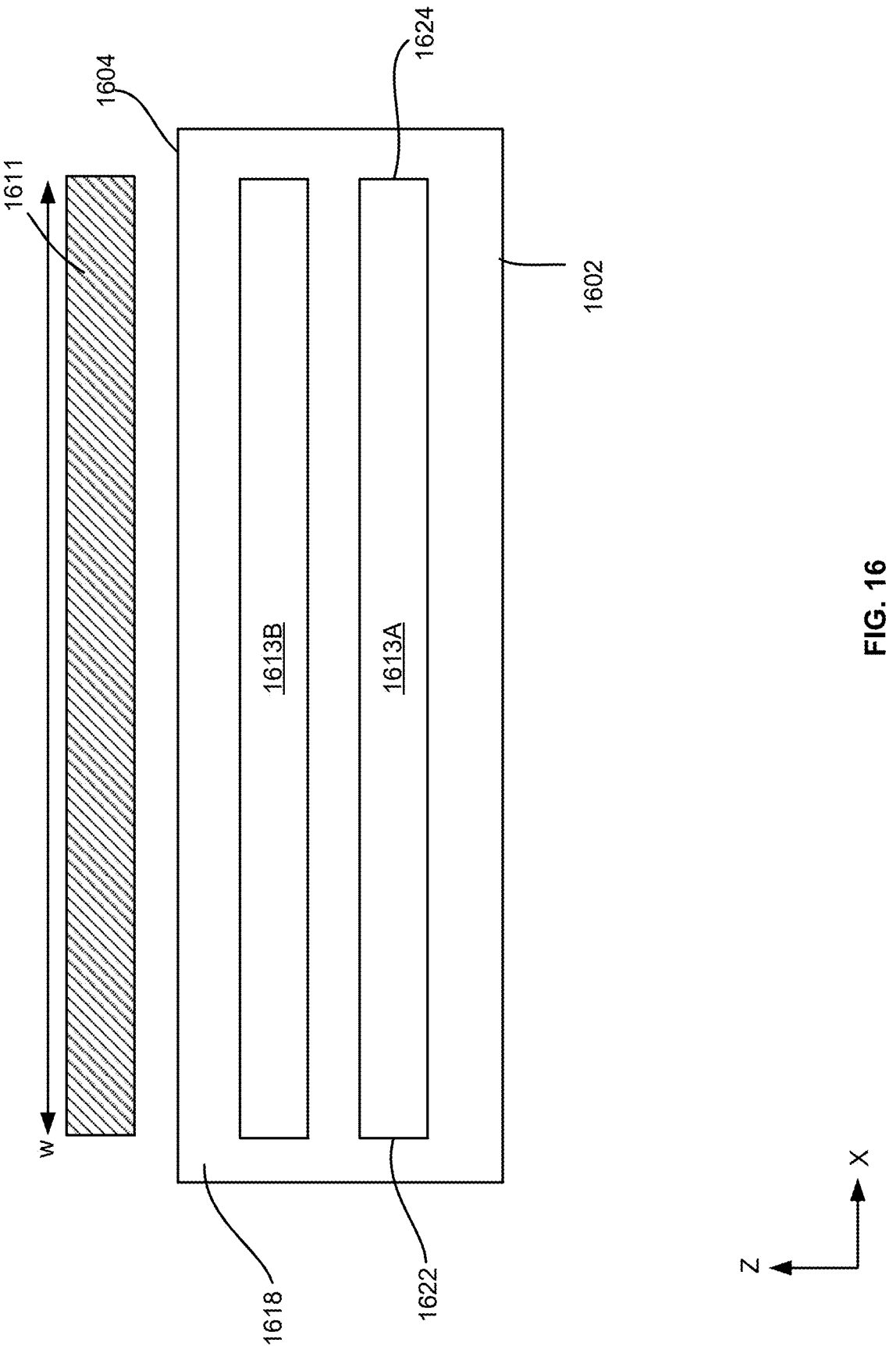
FIG. 16 illustrates an example of a reflective component extending to edges of aligned optical elements in accordance with an embodiment of the present disclosure.

FIG. 16 illustrates an example of a reflective component 1611 extending to edges of aligned optical elements in accordance with an embodiment of the present disclosure. An injection holographic layer (e.g., injection holographic layer 212 in FIG. 2) including optical elements 1613A-1613B is disposed between a first surface 1602 of a substrate 1618 and a second surface 1604 of a substrate 1618. Light is received from a display light engine through the first surface 1602 and is diffracted by optical elements 1613A-1613B. Remaining light, and light outcoupled by the optical elements 1613A-1613B towards the second surface 1604 can be reflected by the reflective component 1611 towards the first surface 1602.

In an example, the optical element 1613A has a first edge 1622 and a second edge 1624. The reflective component 1611 has a width (w) that extends between the first edge 1622 and the second edge 1624. Alternatively, the reflective component 1611 may only extend to a predefined distance from the first edge 1622 and/or the second edge 1624 (e.g., between the last light bounce on the second surface 1604 and the last light bounce on the first surface 1602).

Figure 17:
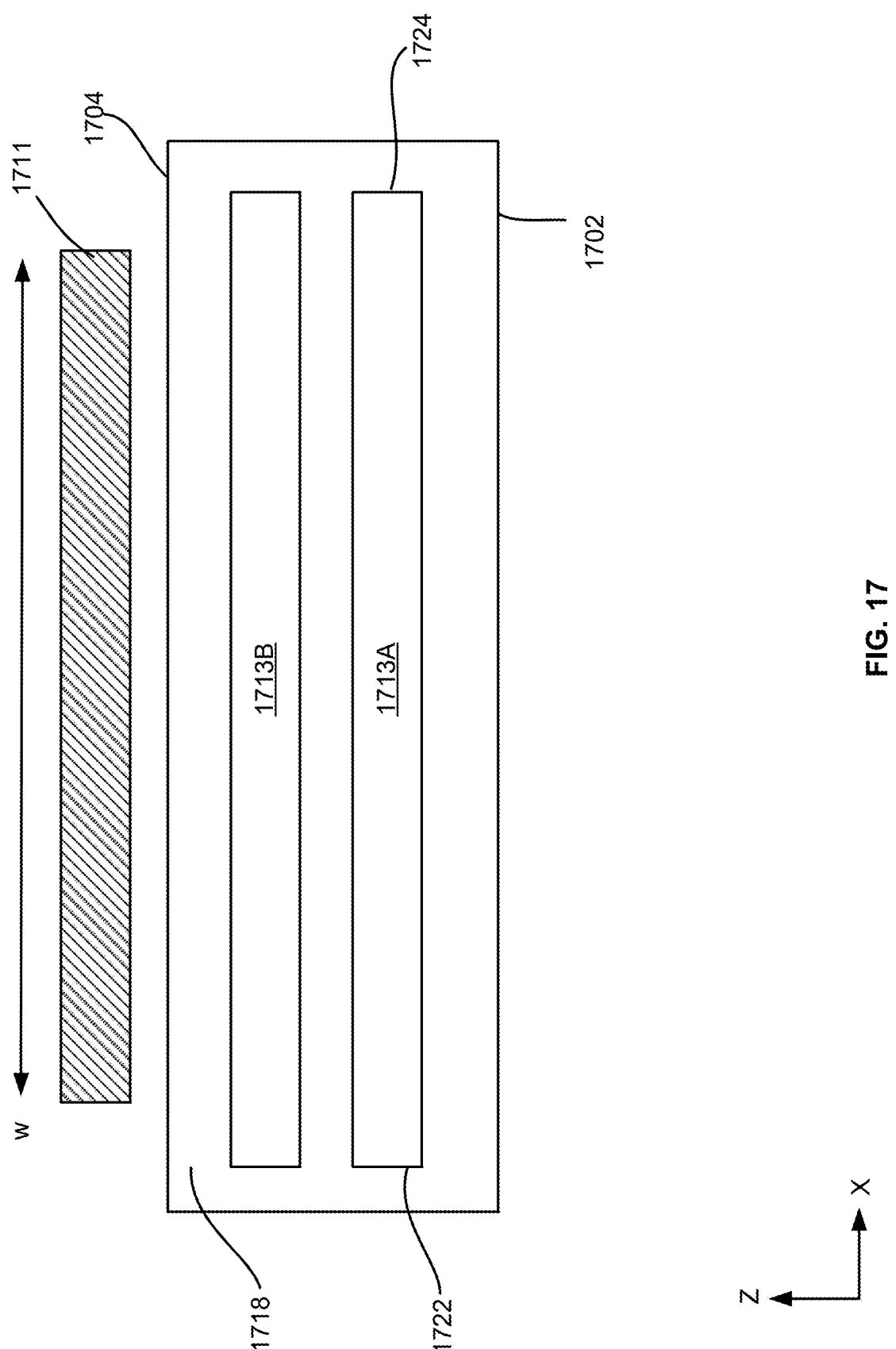
FIG. 17 illustrates an example of a reflective component extending to a predefined distance from an edge of an optical element in accordance with an embodiment of the present disclosure.

FIG. 17 illustrates an example of a reflective component 1711 extending to a predefined distance from an edge of an optical element in accordance with an embodiment of the present disclosure. An injection holographic layer (e.g., injection holographic layer 212 in FIG. 2) including optical elements 1713A-1713B is disposed between a first surface 1702 of a substrate 1718 and a second surface 1704 of the substrate 1718. The optical element 1713A has a first edge 1722 and a second edge 1724. The reflective component 1711 has a width (w) that extends to a predefined distance from the first edge 1722 and/or the second edge 1724. As illustrated, the width extends to a predefined distance from both the first edge 1722 and the second edge 1724.

Figure 18:
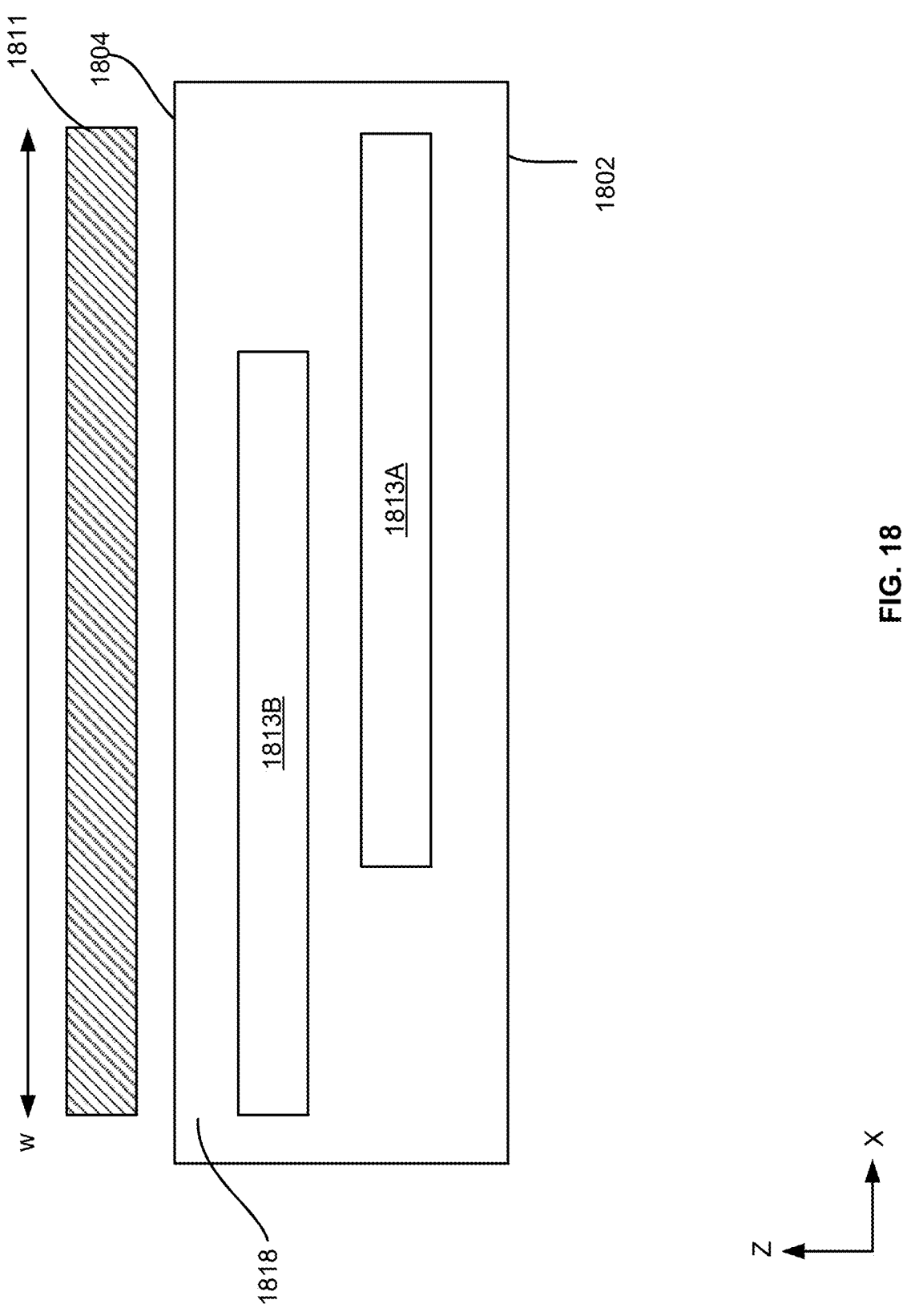
FIG. 18 illustrates an example of a reflective component extending to edges of partially overlapping optical elements in accordance with an embodiment of the present disclosure.

FIG. 18 illustrates an example of a reflective component 1811 extending to edges of partially overlapping optical elements in accordance with an embodiment of the present disclosure. An injection holographic layer (e.g., injection holographic layer 212 in FIG. 2) including optical elements 1813A-1813B is disposed between a first surface 1802 of a substrate 1818 and a second surface 1804 of the substrate 1818. The optical elements 1813A-1813B can be volume holographic optical elements that diffract light in different directions. The optical elements 1813A-1813B partially overlap and are parallel to each other. That is, the optical elements 1813A-1813B are laterally offset from each other in the x-direction. The reflective component 1811 has a width (w) that extends to the edges of both of the optical elements 1813A-1813B.

In the above embodiments, different configurations of an injection holographic layer, a substrate, and a reflective component are described. Any of such configurations can be implemented in the bi-ocular waveguide described in the present disclosure.

Figure 19:
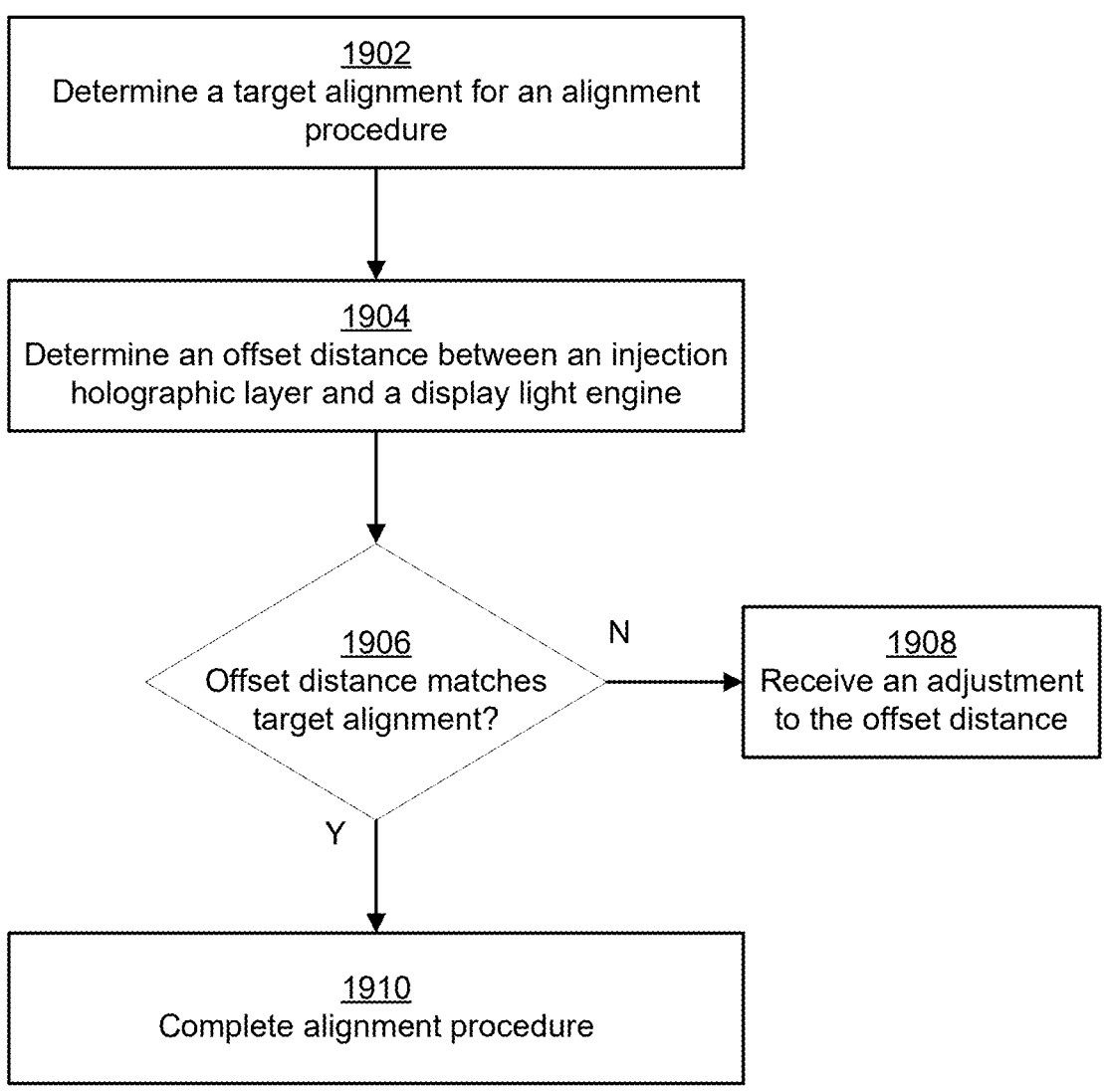
FIG. 19 illustrates an example of a flow for an alignment procedure associated with a bi-ocular waveguide, in accordance with an embodiment of the disclosure.

FIG. 19 illustrates an example of a flow for an alignment procedure associated with a bi-ocular waveguide, in accordance with an embodiment of the disclosure. An alignment system is described as performing the operations of the example flow. While the operations are illustrated in a particular order, it should be understood that no particular order.

In an example, the flow includes operation 1902, where the alignment system determines a target alignment for an alignment procedure. The target alignment can define a target offset distance between a center point of a display light engine and a center point of an injection holographic layer. The target alignment may be predefined prior to the alignment procedure. The target offset distance may be based on a width of the injection holographic layer (e.g., the width can indicate a number of light bounces depending on different characteristics of the waveguide substrate, the injection holographic layer, and the light injection angle, for example; the target distance can be set such the number of bounces in one direction is different than the number of bounces in another direction).

In an example, the flow includes operation 1904, where the alignment system determines an offset distance between an injection holographic layer and a display light engine. The alignment system can perform mechanical or optical measurements of the offset distance between the injection holographic layer and the display light engine.

In an example, the flow includes operation 1906, where the alignment system determines whether the offset distance matches the target alignment. The alignment system can compare the offset distance to the target alignment. If the offset distance matches the target alignment, the process proceeds to operation 1910. Otherwise, the process proceeds to operation 1908.

In an example, the flow includes operation 1908, where the alignment system receives an adjustment to the offset distance. The center point of the display light engine may be laterally adjusted in a propagation direction relative to the center point of the injection holographic layer. The alignment system may receive an indication of the adjustment to the offset distance.

In an example, the flow includes operation 1910, where the alignment system completes the alignment procedure. For example, once the lateral offset matches the target alignment, the alignment system declares that no further adjustments are needed.

FIG. 20 illustrates an example of a flow for an active alignment procedure for a bi-ocular waveguide, in accordance with an embodiment of the disclosure. An alignment system is described as performing the operations of the example flow. While the operations are illustrated in a particular order, it should be understood that no particular order.

In an example, the flow includes operation 2002, where the alignment system measures a first brightness of first light diffracted in a first propagation direction. A first portion of light that is emitted by a display light engine towards an injection holographic layer is diffracted in the first propagation direction by an optical element of the injection holographic layer. The first portion can be redirected by a redirection holographic layer and extracted by an extraction holographic layer, at which point a camera of the alignment system can generate an image that is processed by a processor of the alignment system to determine the first brightness of the first light. Additionally, or alternatively, a power meter of the alignment system can be disposed such that to perform measurements on the first light extracted from the extraction holographic layer. These measurements are processed to determine the first brightness.

In an example, the flow includes operation 2004, where the alignment system measures a second brightness of second light diffracted in a second propagation direction. A second portion of light that is emitted by the display light engine towards the injection holographic layer is diffracted in the second propagation direction by another optical element of the injection holographic layer. The second portion can be redirected by another redirection holographic layer and extracted by another extraction holographic layer, at which point the camera (or a different camera) can generate an image that is processed by the processor of the alignment system to determine the second brightness of second light. Additionally, or alternatively, the power meter (or a different power meter) can be disposed such that to perform measurements on the second light extracted from the other extraction holographic layer. These measurements are processed to determine the second brightness.

In an example, the flow includes operation 2006, where the alignment system determines a difference between the first brightness and the second brightness. The alignment system can compare the first brightness and the second brightness to determine whether there is a difference between the first brightness and the second brightness. If there is no difference, the alignment system determines that the display light engine and the injection holographic element have a target alignment. Otherwise, the process can proceed to operation 2008.

In an example, the flow includes operation 2008, where the alignment system determines an offset for the display light engine and the injection holographic layer based on the difference. The alignment system may determine that a position of the display light engine relative to the injection holographic layer is to be adjusted based on the difference to reach the offset. In addition, the alignment system may determine the amount of the adjustment needed to reach the offset. The display light engine can then be adjusted and operations 2002 through 2008 may be repeated to verify that the offset results in matching light brightness measurements.

Figure 21:
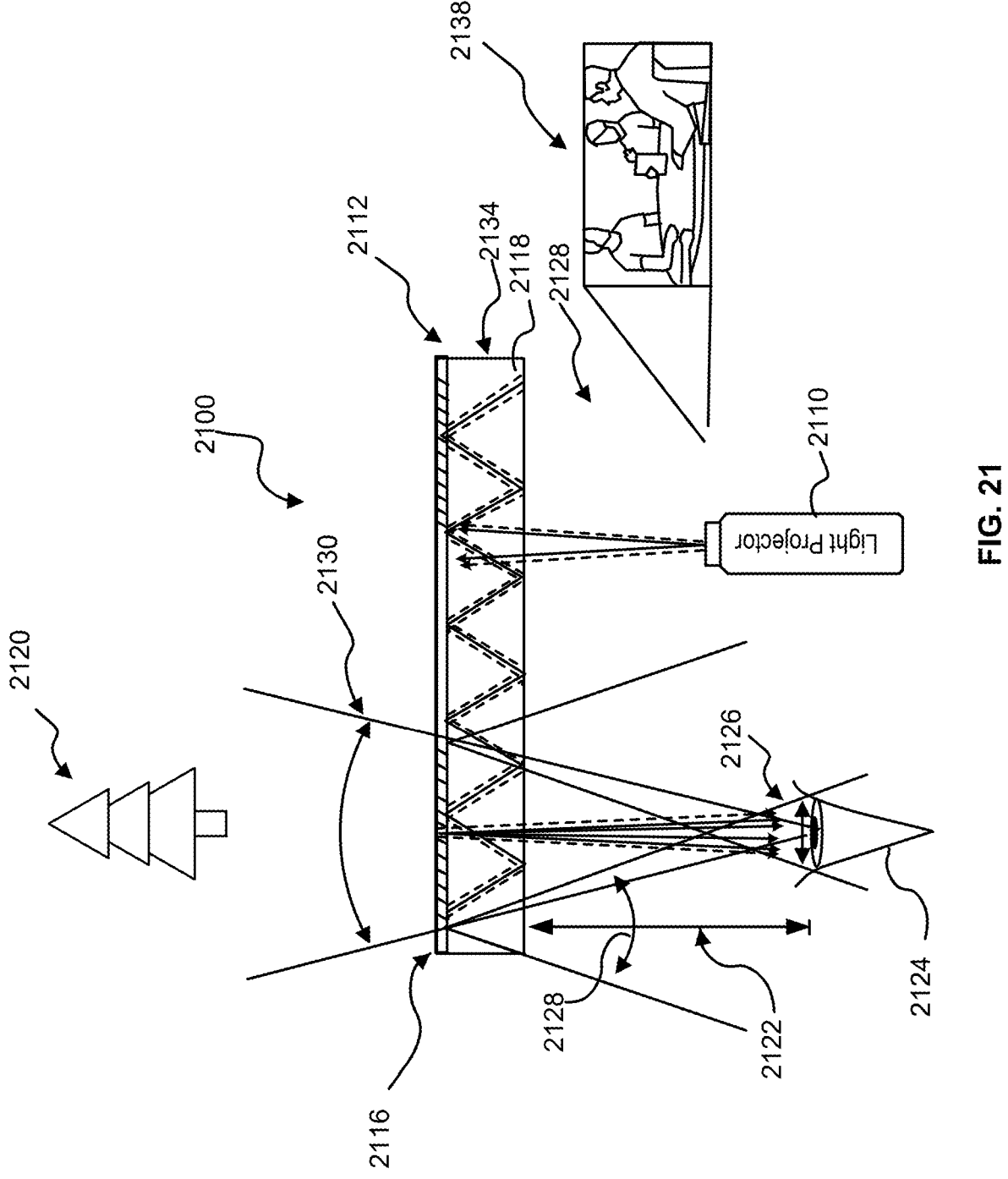
FIG. 21 illustrates a schematic of a system of a waveguide combiner in accordance with an embodiment of the present disclosure.

FIG. 21 illustrates a schematic of a system of an optical lens set and image combiner in accordance with an embodiment of the present disclosure. An optical system 2100 can be used in a mixed reality display, such as a heads-up display or an augmented reality display. The optical system 2100 includes a light source 2110, processing circuitry 2112 communicatively coupled with the light source 2110 (e.g., processor, memory, etc.), and optical elements optically coupled with the light source 2110 and/or with each other. The optical elements include, among other things, mirrors 2114A and 214B, an injection stack of injection hologram 2122A and 2122B, redirection holograms 2132A and 2132B, and extraction holograms 2142A and 2142B. Although not illustrated, the optical elements can also include a set of optical waveguides and can form an optical combiner (e.g., a bi-ocular optical combiner). The processing circuitry 2110 can control light emission of the light source 2110. Light emitted by the light source 2110 propagates toward the first injection hologram 2122A. This propagation is illustrated as involving the first mirror 2114A that receives the light and reflects to the second mirror 2144B that, in turn, reflects it toward the input surface of the first injection hologram 2122A. The input surface is parallel to and closer to the viewer side than the real-world side. The stack injection stack propagates the light in a first direction towards the first redirection hologram 2132A and in a second direction towards the second redirection 2132A according to the techniques described herein above. These techniques can include the use of a reflective component parallel to the injection stack and closer to the real-world side than the viewer side. The techniques can also include an offset between the light source 2110 and the injection stack. In FIG. 21, because the light emitted by the light source 2210 propagates using mirrors, the offset can be defined relative to the second mirror 2144B (e.g., an offset between a reference point of the input surface and a reference point of the second mirror 2144B) or relative to the center incidence axis (e.g., an offset between the center of the input surface and the center incidence axis). In turn, each of the two redirection holograms 2132A and 2132B redirects the corresponding light towards one of the extraction holograms 2142A or 2142B. The first extraction hologram 2142A extracts light towards the viewer side (e.g., towards a first user eye). The second extraction hologram 2142B also extracts light towards the viewer side (e.g., towards a second user eye). In the arrangement of FIG. 21, the light source 2110 (or the second mirror 2144B) and the reflective component (not shown) are disposed on opposite sides of the injection stack (e.g., the light source 2110 and the second mirror 2144B are disposed on the viewer side, whereas the reflective component is disposed on the world side). The light is incident to the input surface along an incidence axis and is propagated from the injection stack in two directions that intersect with the incidence axis.

In an example, pupil replication decouples the pupil size from the field of view, which are otherwise inversely linked in other types of mixed reality systems. This advantage means that the optical combiner based displays can offer a large eye box together with a large image field of view. In an example, the optical combiner formed by the optical elements of FIG. 21 may be a waveguide optical combiner. Nonetheless, other optical combiner types are possible, such as a holographic optical element-based combiner, or any other suitable optical combiner, in other examples.

Pupil replication in the optical combiner can be obtained when the image that is propagating inside the optical combiner is only partially extracted (or redirected) the optical combiner. When this happens, the remainder of the light keeps propagating in its original direction inside the optical combiner. The remaining light bounces on the outer surface of the optical combiner and then interacts again with the holographic optical element, where another portion is extracted (or redirected). Successive extractions of the light replicate the pupil multiple times.

The optical combiner can be built using waveguide holography. Waveguide holography uses an injection hologram to trap auxiliary content (e.g., projector-emitted light representing virtual images) inside a substrate through TIR. The auxiliary content can be generated by the light source 2110. In the substrate, the auxiliary content propagates away from the light source 2110 and is outcoupled toward a viewer's eye by an extraction hologram. A hologram represents a functional diffractive structure that transforms the waveform of the input beam into an output beam. A volume holographic element (VHOE) is a type of hologram that operates in the Bragg diffraction regime. The optical combiner represents the optical elements in the optical path from the exit aperture of the light source 2110 to the plane where light enters the viewer's eye. Both the injection hologram and the extraction hologram (and likewise a redirection hologram) are transparent across the entire or a predefined visible range except for a percent reduction (depending on different parameters such as the type materials used, thickness, etc.) in transmission across the bandwidth of the broadband red-green-blue (RGB) light sources. This allows the viewer to see real imagery and the auxiliary content.

An injection hologram and an extraction hologram to be on a same side of the substrate. However, the injection hologram and the extraction hologram can be on opposite sides of the substrate. Generally, the injection hologram is coupled to an input surface of the substrate by, for instance, being mounted to and attached to the input surface. Likewise, the extraction hologram is coupled to an output surface of the substrate by, for instance, being mounted to and attached to the output surface. The input surface corresponds to a surface where light from the light source 2110 is received. The output surface corresponds to a surface from which light is emitted from the substrate.

The optical combiner can form the eye box in the horizontal and vertical directions. The eye box can correspond to the vertical and horizontal distance where the viewer's pupil receives all the angles emitted by the light source 2110. As the viewer's pupil moves outside the eye box, the image becomes degraded. Eye relief is the distance between the substrate surface and the entrance pupil of the viewer's eye. For maximum comfort, this distance should be larger than a minimum threshold distance. The field-of-view is the angular size of the image determined by the geometric relationship between the size of the extraction hologram and the distance between the pupil and the surface of the extraction hologram.

Waveguide combiners using holographic optical elements can operate in either a transmission mode where the light is diffracted as it passes through the holographic optical element or in a reflection mode where the light is diffracted and returns in the opposite direction after striking the holographic optical element. Such waveguide combiners can be used in near-to-eye (NTE) systems to achieve a particular field of view. Field of view angles can be measured in air and acceptance angles for reflection volume holographic optical element are measured inside the substrate. The relationship between the air and substrate angles is described by Snell's law.

Holographic optical elements operating in reflection mode can be volume holographic optical elements. A reflection volume holographic optical element is capable of in-coupling into substrate modes (light propagating through total internal reflection).

A properly designed optical combiner can have a high transmission (e.g., at least 80%) of the light from the real imagery, a large auxiliary field of view diagonally, vertically and horizontally, a large eye box, and an ability to accept the auxiliary content from broadband light emitting diode RGB inputs. To build such an optical waveguide combiner, several issues can be addressed.

Light projectors are designed to achieve a certain white balance (the ratio between the primary emission wavelengths that provide a natural looking image-white balance is typically expressed in degrees Kelvin of a black body source producing the same spectral distribution). The optical combiner maintains the white balance of the light source 2110 along the optical path to the viewer's eye.

While either transmission or reflection holographic optical element can be implemented in the display to produce a large field of view, reflection holographic optical elements can provide a large horizontal field of view. Transmission holographic optical elements can be used in the optical combiner when the angular requirements on the field of views are smaller. Both horizontal and vertical field of views can be limited by the distance from the aperture stop of the light projector source to the center of the extraction hologram. In order for NTE glasses to accommodate size, weight, and power restrictions, the size of the light source

2110 should be as small as possible. In some designs, this makes the size of the aperture stop (pupil) as small as five mm in diameter in relation to the desired vertical field of view. In this case, the limitation on vertical field of view can become significant and would need to be expanded. Pupil expansion in the horizontal direction is naturally provided by the waveguide geometry of the optical combiner. This is because the light forming the image experiences multiple bounces in the direction of the extraction hologram and multiple light extractions can expand the eye box. In particular, a portion of the light can be extracted and output by each of the diffraction gratings of the extraction hologram.

The arrangement of components of the optical system 2100 is provided for illustrative purposes. Different possible of such components are possible. For example, the eye box can be centered, positioned near center, or positioned at a particular distance from the center of the optical combiner.

Figure 22:
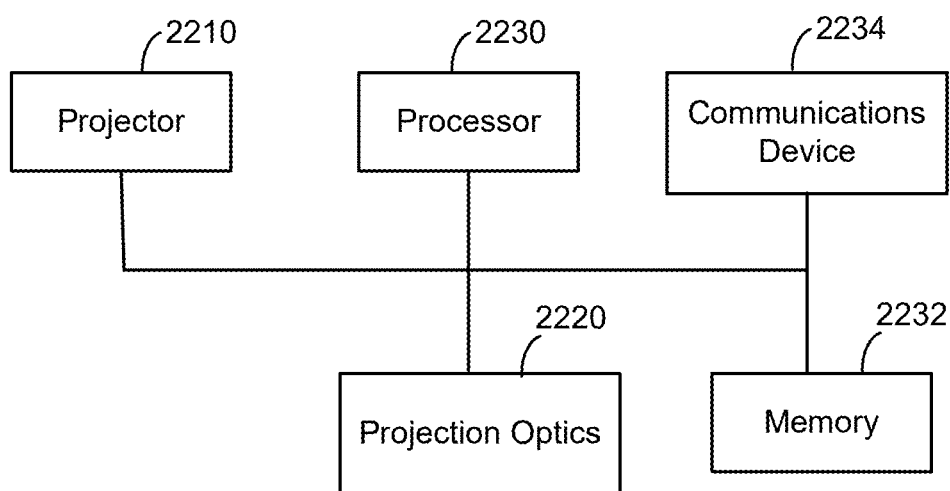
FIG. 22 illustrates a schematic diagram of an optical system in accordance with an embodiment of the present disclosure.

FIG. 22 illustrates a schematic diagram of an optical system 2200 system in accordance with an embodiment of the present disclosure. As illustrated in FIG. 22, the optical system 2200 supports a mixed reality device, such as any of the devices described herein above. In an example, the optical system 2200 includes a projector 2210, which can be implemented as discussed in relation to the light source discussed herein above. The optical system 2200 includes an optical waveguide system including components of a bi-ocular system. The optical system 2200 can also include projection optics 2220 operable to direct light produced using projector 2210.

The optical system 2200 additionally includes a processor 2230 (e.g., a microprocessor), a memory 2232, and a communications device 2234. The memory 2232, also referred to as storage media or non-transitory computer readable storage media, stores computer-readable instructions of an application, where the computer-readable instructions are executable by the processor 2230 to run the application.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or network browser. It should be appreciated that alternate embodiments may have numerous variations from that described above. For example, customized hardware might also be used and/or particular elements might be implemented in hardware, software (including mobile software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a mobile computing device, a device controller, or a computational engine within an appliance, to name a few.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A bi-ocular system comprising:
a display light engine configured to emit first light that represents an image; and
a bio-ocular waveguide comprising:
a substrate having a first surface and a second surface, wherein the first light is received at the first surface;
an injection holographic layer disposed between the first surface and the second surface and comprising:
a first volume holographic optical element (VHOE) configured to diffract a first portion of the first light such that the first portion propagates within the substrate in a first propagation direction;
a second VHOE configured to diffract a second portion of the first light such that the second portion propagates within the substrate in a second propagation direction, wherein the second propagation direction is parallel to and opposite of the first propagation direction; and
a reflective material coupled to the second surface and configured to reflect a remaining portion of the first light as second light reflected toward the second surface,
wherein the second VHOE is further configured to diffract a first portion of the second light such that the first portion of the second light propagates within the substrate in the first propagation direction, and
wherein the injection holographic layer and the display light engine are aligned such that an offset exists between a reference point of the injection holographic layer and a reference point of the display light engine, wherein the offset is along the second propagation direction;
a first redirection holographic layer configured to redirect the first portion of the first light and the first portion of the second light as a third portion propagating in a third propagation direction;
a second redirection holographic layer configured to redirect the second portion as a fourth portion propagating in a fourth propagation direction;
a first extraction holographic layer configured to extract the third portion as a fifth portion propagating in a fifth propagation direction, wherein the fifth portion represents the image; and
a second extraction holographic layer configured to extract the fourth portion as a sixth portion propagating in a sixth propagation direction, wherein the sixth portion represents the image.

2. The bi-ocular system of claim 1, wherein:
the first VHOE is further configured to diffract a second portion of the second light such that the second portion of the second light propagates within the substrate in the second propagation direction,
the second redirection holographic layer is configured to redirect the second portion of the first light and the second portion of the second light as the fourth portion propagating in the fourth propagation direction, and
the fifth portion and the sixth portion have a same brightness.

3. The bi-ocular system of claim 1, wherein the injection holographic layer has a width defined along a direction parallel to the first propagation direction, and wherein the offset is within a range of twenty percent of the width.

4. A waveguide comprising:
a substrate having a first surface and a second surface;
a holographic layer coupled to the substrate and configured to:

diffract a first portion of first light incident upon the first surface such that the first portion of the first light propagates within the substrate in a first propagation direction;
diffract a second portion of the first light such that the second portion of the first light propagates within the substrate in a second propagation direction, wherein an angle between the second propagation direction and the first propagation direction is larger than or equal to one-hundred twenty degrees; and
a reflective component configured to reflect a remaining portion of the first light as second light incident upon the second surface,
wherein the holographic layer is further configured to diffract a first portion of the second light such that the first portion of the second light propagates within the substrate in the first propagation direction.

5. The waveguide of claim 4, wherein the holographic layer is aligned with a light source such that an offset exists between a reference point of the holographic layer and a reference point of the light source, wherein the offset is along the second propagation direction.

6. The waveguide of claim 4, wherein the holographic layer is disposed between the first surface and the second surface and comprises a first volume holographic optical element (VHOE) and a second VHOE, and wherein:
the first VHOE is configured to diffract the first portion of the first light such that the first portion of the first light propagates within the substrate in the first propagation direction,
the first VHOE is further configured to diffract a second portion of the second light such that the second portion of the second light propagates within the substrate in the second propagation direction,
the second VHOE is configured to diffract the second portion of the first light such that the second portion of the first light propagates within the substrate in the second 10 propagation direction, and
the second VHOE is further configured to diffract the first portion of the second light such that the first portion of the second light propagates within the substrate in the first propagation direction.

7. The waveguide of claim 4, wherein the holographic layer comprises a first optical element and a second optical element, and wherein:
the first optical element is configured to diffract the first portion of the first light at a diffraction angle and comprises at least one of: a first volume holographic optical element (VHOE) or a first surface relief grating (SRG), and
the second second optical element is configured to diffract the first portion of the second light at the same diffraction angle and comprises at least one of: a second VHOE or a second SRG.

8. The waveguide of claim 4, wherein the holographic layer comprises a first optical element and a second optical element, and wherein:
the first optical element is configured to outcouple a third portion of the first light toward the second surface,
the reflective component is configured to reflect the third portion as third light toward the first surface, and
the second optical element is configured to diffract a second portion of the third light such that the second portion of the third light propagates within the substrate in the first propagation direction.

9. The waveguide of claim 4, wherein the holographic layer comprises a first volume holographic optical element (VHOE) and a second VHOE arranged in a stack, and wherein:

the first VHOE is configured to diffract the first portion of the first light, and pass a third portion of the first light toward the second VHOE, the second VHOE is configured to receive the third portion, diffract the second portion of the first light, and pass the remaining portion of the first light toward the reflective component, and the second VHOE is further configured to receive the second light and diffract the first portion of the second light.

10. The waveguide of claim 4, wherein the holographic layer has a first edge and a second edge, and wherein the reflective component is a reflective material disposed on the second surface and has a width that extends between the first edge and the second edge or that extends to a predefined distance from the first edge.

11. The waveguide of claim 4, wherein the reflective component comprises a dielectric mirror disposed at a predefined distance away from the second surface and arranged to be parallel to the second surface.

12. A device comprising:

a light source configured to emit first light; and a waveguide comprising:

a substrate having a first surface and a second surface; and a holographic layer coupled to the substrate and configured to:

diffract a first portion of the first light such that the first portion propagates within the substrate in a first propagation direction, the first light being incident upon the first surface, and diffract a second portion of the first light such that the second portion propagates within the substrate in a second propagation direction, wherein an angle between the second propagation direction and the first propagation direction is larger than or equal to one-hundred twenty degrees, wherein the holographic layer and the light source are aligned such that an offset along the second propagation direction exists between a reference point of the holographic layer and a reference point of the light source.

13. The device of claim 12, wherein the waveguide further comprises:

a reflective component configured to reflect a remaining portion of the first light as second light incident upon the second surface, wherein the holographic layer is further configured to diffract a first portion of the second light such that the first portion of the second light propagates within the substrate in the first propagation direction.

14. The device of claim 13, wherein the holographic layer comprises a plurality of volume holographic optical elements (VHOEs) that are arranged in a stack and that are aligned to have the same reference point of the holographic layer, or a multiplexed hologram that includes a plurality of diffraction gratings.

15. The device of claim 12, wherein the holographic layer comprises a first volume holographic optical element (VHOE) and a second VHOE, wherein the first VHOE and the second VHOE overlap at least partially, wherein the first VHOE or the second VHOE differs at least in thickness or index modulation.

16. The device of claim 12, wherein the holographic layer comprises a first volume holographic optical element (VHOE) and a second VHOE that overlap and that are arranged in a stack, wherein the waveguide further comprises a reflective component configured to reflect a remaining portion of the first light as second light incident upon the second surface, and wherein the light source and the reflective component are arranged on opposite sides of the stack.

17. The device of claim 12, wherein the holographic layer is a first holographic layer and is configured to output the first portion as a first output light toward a second holographic layer and output the second portion as a second output light toward a third holographic layer, wherein the first output light and the second output light have a same brightness.

18. The device of claim 12, wherein the holographic layer comprises a first volume holographic optical element (VHOE) and a second VHOE, and wherein:

the first VHOE is configured to diffract the first portion of the first light such that the first portion propagates in the first propagation direction, the second VHOE is configured to diffract the second portion of the first light such that the second portion propagates in the second propagation direction, and the first VHOE and the second VHOE partially overlap and are parallel to each other.

19. The device of claim 12, wherein the holographic layer and the light source are aligned according to an alignment procedure, wherein the offset is predefined prior to the alignment procedure as a target alignment for the alignment procedure.

20. The device of claim 12, wherein the holographic layer and the light source are aligned according to an alignment procedure that measures light brightness, and wherein the alignment procedure sets the offset based on light brightness measurements.

* * * * *